United States Patent
Loiseau et al.

(10) Patent No.: US 9,388,335 B2
(45) Date of Patent: Jul. 12, 2016

(54) PICKERING EMULSION TREATMENT FLUID

(71) Applicant: Schlumberger Technology Corporation, Sugar Land, TX (US)

(72) Inventors: Anthony Loiseau, Sugar Land, TX (US); Yiyan Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 349 days.

(21) Appl. No.: 13/950,483

(22) Filed: Jul. 25, 2013

(65) Prior Publication Data

US 2015/0027699 A1 Jan. 29, 2015

(51) Int. Cl.
*C09K 8/92* (2006.01)
*C09K 8/80* (2006.01)

(52) U.S. Cl.
CPC ... *C09K 8/92* (2013.01); *C09K 8/80* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 219,377 A | 3/1940 | Stratford |
| 251,394 A | 7/1950 | Kessler |
| RE24,570 E | 11/1958 | Mangold et al. |
| 290,524 A | 9/1959 | De Priester |
| 336,247 A | 1/1968 | Huitt |
| 343,454 A | 3/1969 | Stein |
| 367,571 A | 7/1972 | Goins, Jr. |
| 3,887,474 A | 6/1975 | Senfe et al. |
| 3,937,283 A | 2/1976 | Blauer et al. |
| 4,051,900 A | 10/1977 | Hankins |
| 4,387,769 A | 6/1983 | Erbstoesser et al. |
| 4,506,734 A | 3/1985 | Nolte |
| 4,526,695 A | 7/1985 | Erbstoesser et al. |
| 4,606,407 A | 8/1986 | Shu |
| 4,652,257 A | 3/1987 | Chang |
| 4,665,988 A | 5/1987 | Murphey et al. |
| 4,670,166 A | 6/1987 | McDougall et al. |
| 4,718,490 A | 1/1988 | Uhri |
| 4,738,897 A | 4/1988 | McDougall et al. |
| 4,785,884 A | 11/1988 | Armbruster |
| 4,848,467 A | 7/1989 | Cantu et al. |
| 4,867,241 A | 9/1989 | Strubhar |
| 4,883,124 A | 11/1989 | Jennings, Jr. |

(Continued)

FOREIGN PATENT DOCUMENTS

| CA | 2710988 | 7/2009 |
|---|---|---|
| EP | 1236701 | 9/2002 |

(Continued)

OTHER PUBLICATIONS

Kirk-Othmer Encyclopedia of Chemical Technology, vol. 17, pp. 143-167 (1982), "Petroleum (Drilling Fluids)".

(Continued)

*Primary Examiner* — John J Figueroa

(57) ABSTRACT

A well treatment fluid comprising a Pickering particle emulsion comprising particles of a first liquid phase dispersed in a continuous second liquid phase, and comprising a plurality of colloidal particles adsorbed to a liquid-liquid interface between the first liquid phase and the second liquid phase. Methods, equipment and/or systems for treating a subterranean formation utilizing such treatment fluids are also disclosed.

14 Claims, 4 Drawing Sheets

(56) References Cited

U.S. PATENT DOCUMENTS

| | | |
|---|---|---|
| 4,917,185 A | 4/1990 | Jennings, Jr. et al. |
| 4,951,751 A | 8/1990 | Jennings, Jr. |
| 4,957,165 A | 9/1990 | Cantu et al. |
| 4,968,353 A | 11/1990 | Kawasaki et al. |
| 4,968,354 A | 11/1990 | Nishiura et al. |
| 4,977,961 A | 12/1990 | Avasthi |
| 4,986,355 A | 1/1991 | Casad et al. |
| 5,036,920 A | 8/1991 | Cornette et al. |
| 5,095,987 A | 3/1992 | Weaver et al. |
| 5,161,618 A | 11/1992 | Jones et al. |
| 5,188,837 A | 2/1993 | Domb |
| 5,238,067 A | 8/1993 | Jennings, Jr. |
| 5,325,921 A | 7/1994 | Johnson et al. |
| 5,330,005 A | 7/1994 | Card et al. |
| 5,332,037 A | 7/1994 | Schmidt et al. |
| 5,333,689 A | 8/1994 | Jones et al. |
| 5,415,228 A | 5/1995 | Price et al. |
| 5,439,055 A | 8/1995 | Card et al. |
| 5,492,178 A | 2/1996 | Nguyen et al. |
| 5,501,274 A | 3/1996 | Nguyen et al. |
| 5,501,275 A | 3/1996 | Card et al. |
| 5,507,342 A | 4/1996 | Copeland et al. |
| 5,518,996 A | 5/1996 | Maroy et al. |
| 5,551,516 A | 9/1996 | Norman et al. |
| 5,629,271 A | 5/1997 | Dobson, Jr. et al. |
| 5,713,416 A | 2/1998 | Chatterji et al. |
| 5,741,758 A | 4/1998 | Pakulski |
| 5,893,416 A | 4/1999 | Read |
| 5,908,073 A | 6/1999 | Nguyen et al. |
| 5,922,652 A | 7/1999 | Kowalski et al. |
| 5,934,376 A | 8/1999 | Nguyen et al. |
| 5,964,291 A | 10/1999 | Bourne et al. |
| 5,979,557 A | 11/1999 | Card et al. |
| 6,059,034 A | 5/2000 | Rickards et al. |
| 6,114,410 A | 9/2000 | Betzold |
| 6,156,805 A | 12/2000 | Smith et al. |
| 6,172,011 B1 | 1/2001 | Card et al. |
| 6,209,643 B1 | 4/2001 | Nguyen et al. |
| 6,209,646 B1 | 4/2001 | Reddy et al. |
| 6,239,183 B1 | 5/2001 | Farmer et al. |
| 6,258,859 B1 | 7/2001 | Dahayanake et al. |
| 6,279,656 B1 | 8/2001 | Sinclair et al. |
| 6,302,207 B1 | 10/2001 | Nguyen et al. |
| 6,326,335 B1 | 12/2001 | Kowalski et al. |
| 6,328,105 B1 | 12/2001 | Betzold |
| 6,330,916 B1 | 12/2001 | Rickards et al. |
| 6,364,020 B1 | 4/2002 | Crawshaw et al. |
| 6,379,865 B1 | 4/2002 | Mao et al. |
| 6,380,136 B1 | 4/2002 | Bates et al. |
| 6,435,277 B1 | 8/2002 | Qu et al. |
| 6,439,309 B1 | 8/2002 | Matherly et al. |
| 6,446,722 B2 | 9/2002 | Nguyen et al. |
| 6,464,009 B2 | 10/2002 | Bland et al. |
| 6,482,517 B1 | 11/2002 | Anderson |
| 6,506,710 B1 | 1/2003 | Hoey et al. |
| 6,543,538 B2 | 4/2003 | Tolman et al. |
| 6,559,245 B2 | 5/2003 | Mao et al. |
| 6,599,863 B1 | 7/2003 | Palmer et al. |
| 6,656,265 B1 | 12/2003 | Garnier et al. |
| 6,703,352 B2 | 3/2004 | Dahayanake et al. |
| 6,719,054 B2 | 4/2004 | Cheng et al. |
| 6,723,683 B2 | 4/2004 | Crossman et al. |
| 6,725,930 B2 | 4/2004 | Boney et al. |
| 6,742,590 B1 | 6/2004 | Nguyen |
| 6,776,235 B1 | 8/2004 | England |
| 6,818,594 B1 | 11/2004 | Freeman et al. |
| 6,828,280 B2 | 12/2004 | England et al. |
| 6,860,328 B2 | 3/2005 | Gonzalez et al. |
| 6,874,578 B1 | 4/2005 | Garnier et al. |
| 6,877,560 B2 | 4/2005 | Nguyen et al. |
| 6,938,693 B2 | 9/2005 | Boney et al. |
| 6,989,195 B2 | 1/2006 | Anderson |
| 7,004,255 B2 | 2/2006 | Boney |
| 7,028,775 B2 | 4/2006 | Fu et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,060,661 B2 | 6/2006 | Dobson, Sr. et al. |
| 7,066,260 B2 | 6/2006 | Sullivan et al. |
| 7,084,095 B2 | 8/2006 | Lee et al. |
| 7,148,185 B2 | 12/2006 | Fu et al. |
| 7,166,560 B2 | 1/2007 | Still et al. |
| 7,178,596 B2 | 2/2007 | Blauch et al. |
| 7,213,651 B2 | 5/2007 | Brannon et al. |
| 7,219,731 B2 | 5/2007 | Sullivan et al. |
| 7,237,610 B1 | 7/2007 | Saini et al. |
| 7,261,157 B2 | 8/2007 | Nguyen et al. |
| 7,265,079 B2 | 9/2007 | Willberg et al. |
| 7,267,170 B2 | 9/2007 | Mang et al. |
| 7,275,596 B2 | 10/2007 | Willberg et al. |
| 7,284,611 B2 | 10/2007 | Reddy et al. |
| 7,290,615 B2 | 11/2007 | Christanti et al. |
| 7,294,347 B2 | 11/2007 | Menjoge et al. |
| 7,303,018 B2 | 12/2007 | Cawiezel et al. |
| 7,345,012 B2 | 3/2008 | Chen et al. |
| 7,373,991 B2 | 5/2008 | Vaidya et al. |
| 7,398,826 B2 | 7/2008 | Hoefer et al. |
| 7,405,183 B2 | 7/2008 | Hanes, Jr. |
| 7,419,937 B2 | 9/2008 | Rimmer et al. |
| 7,451,812 B2 | 11/2008 | Cooper et al. |
| 7,482,311 B2 | 1/2009 | Willberg et al. |
| 7,493,955 B2 | 2/2009 | Gupta et al. |
| 7,510,009 B2 | 3/2009 | Cawiezel et al. |
| 7,528,096 B2 | 5/2009 | Brannon et al. |
| 7,543,640 B2 | 6/2009 | MacDougall |
| 7,559,369 B2 | 7/2009 | Roddy et al. |
| 7,565,929 B2 | 7/2009 | Bustos et al. |
| 7,581,590 B2 | 9/2009 | Lesko et al. |
| 7,624,802 B2 | 12/2009 | McCrary et al. |
| 7,644,761 B1 | 1/2010 | Gu et al. |
| 7,703,531 B2 | 4/2010 | Huang et al. |
| 7,784,541 B2 | 8/2010 | Hartman et al. |
| 7,789,146 B2 | 9/2010 | Panga et al. |
| 7,806,182 B2 | 10/2010 | Waters et al. |
| 7,833,947 B1 | 11/2010 | Kubala |
| 7,923,415 B2 | 4/2011 | Panga et al. |
| 7,931,088 B2 | 4/2011 | Stegemoeller et al. |
| 7,954,548 B2 | 6/2011 | Curimbaba et al. |
| 7,973,991 B2 | 7/2011 | Watanabe |
| 8,008,234 B2 | 8/2011 | Panga et al. |
| 8,119,574 B2 | 2/2012 | Panga et al. |
| 8,167,043 B2 | 5/2012 | Willberg et al. |
| 8,168,570 B2 | 5/2012 | Barron et al. |
| 8,210,249 B2 | 7/2012 | Panga et al. |
| 2003/0134751 A1 | 7/2003 | Lee et al. |
| 2004/0060702 A1 | 4/2004 | Kotlar et al. |
| 2004/0074646 A1 | 4/2004 | Kotlar et al. |
| 2004/0106525 A1 | 6/2004 | Willberg et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0027499 A1 | 2/2005 | Bourbiaux et al. |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0161220 A1 | 7/2005 | Todd et al. |
| 2005/0172699 A1 | 8/2005 | Hu et al. |
| 2005/0233895 A1 | 10/2005 | Mertens et al. |
| 2005/0252651 A1 | 11/2005 | Bosma et al. |
| 2005/0252659 A1 | 11/2005 | Sullivan et al. |
| 2006/0006539 A1 | 1/2006 | Matsui et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |
| 2006/0058197 A1 | 3/2006 | Brown et al. |
| 2006/0073980 A1 | 4/2006 | Brannon et al. |
| 2006/0113078 A1 | 6/2006 | Nguyen et al. |
| 2006/0124302 A1 | 6/2006 | Gupta et al. |
| 2006/0151173 A1 | 7/2006 | Slabaugh et al. |
| 2006/0157243 A1 | 7/2006 | Nguyen |
| 2006/0175059 A1 | 8/2006 | Sinclair et al. |

(56) References Cited

U.S. PATENT DOCUMENTS

| | | | |
|---|---|---|---|
| 2006/0185848 A1 | 8/2006 | Surjaatmadja et al. |
| 2006/0289160 A1 | 12/2006 | van Batenburg et al. |
| 2007/0017675 A1 | 1/2007 | Hammami et al. |
| 2007/0029086 A1 | 2/2007 | East, Jr. |
| 2007/0039733 A1 | 2/2007 | Welton et al. |
| 2007/0042912 A1 | 2/2007 | Welton et al. |
| 2007/0044963 A1 | 3/2007 | MacDougall |
| 2007/0238623 A1 | 10/2007 | Saini et al. |
| 2008/0000391 A1 | 1/2008 | Drochon |
| 2008/0000638 A1 | 1/2008 | Burukhin et al. |
| 2008/0053657 A1 | 3/2008 | Alary et al. |
| 2008/0066910 A1 | 3/2008 | Alary et al. |
| 2008/0093073 A1 | 4/2008 | Bustos et al. |
| 2008/0103065 A1 | 5/2008 | Reddy et al. |
| 2008/0108520 A1 | 5/2008 | Fu |
| 2008/0121395 A1 | 5/2008 | Reddy et al. |
| 2008/0135250 A1 | 6/2008 | Bosma et al. |
| 2008/0210423 A1 | 9/2008 | Boney |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1 | 1/2009 | Panga et al. |
| 2009/0025934 A1 | 1/2009 | Hartman et al. |
| 2009/0107671 A1 | 4/2009 | Waters et al. |
| 2009/0294126 A1 | 12/2009 | Dalrymple et al. |
| 2010/0000735 A1 | 1/2010 | Weaver et al. |
| 2010/0065269 A1 | 3/2010 | Ballard |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1 | 5/2010 | Cornelissen et al. |
| 2010/0200247 A1 | 8/2010 | Dybevik et al. |
| 2010/0234230 A1 | 9/2010 | Fowler |
| 2010/0243248 A1* | 9/2010 | Golomb | C09K 8/58 166/270 |
| 2010/0252259 A1 | 10/2010 | Horton |
| 2010/0300688 A1 | 12/2010 | Panga et al. |
| 2011/0005760 A1 | 1/2011 | Hartman et al. |
| 2011/0036577 A1 | 2/2011 | Barmatov et al. |
| 2011/0053813 A1 | 3/2011 | Panga et al. |
| 2011/0098202 A1 | 4/2011 | James et al. |
| 2011/0155371 A1 | 6/2011 | Panga et al. |
| 2011/0198089 A1 | 8/2011 | Panga et al. |
| 2011/0247812 A1 | 10/2011 | Panga et al. |
| 2011/0312857 A1 | 12/2011 | Amanullah et al. |
| 2012/0000641 A1 | 1/2012 | Panga et al. |
| 2012/0000651 A1 | 1/2012 | Panga et al. |
| 2012/0132421 A1 | 5/2012 | Loiseau et al. |
| 2012/0138296 A1 | 6/2012 | Panga et al. |
| 2012/0190598 A1 | 7/2012 | McCubbins, Jr. et al. |
| 2012/0247764 A1 | 10/2012 | Chen et al. |
| 2012/0285694 A1 | 11/2012 | Morvan et al. |
| 2012/0305245 A1 | 12/2012 | Loiseau et al. |
| 2012/0305254 A1 | 12/2012 | Chen et al. |

FOREIGN PATENT DOCUMENTS

| | | |
|---|---|---|
| EP | 2473705 | 7/2012 |
| GB | 2277543 | 11/1994 |
| RU | 2065442 | 8/1996 |
| RU | 2221130 | 1/2004 |
| RU | 2376451 | 12/2009 |
| RU | 2404359 | 11/2010 |
| RU | 2413064 | 2/2011 |
| RU | 2417243 | 4/2011 |
| WO | WO9607710 | 3/1996 |
| WO | WO9930249 | 6/1999 |
| WO | WO2004007904 | 1/2004 |
| WO | WO2004038176 | 5/2004 |
| WO | WO2006082359 | 8/2006 |
| WO | WO2009013710 | 1/2009 |
| WO | WO2009069058 | 6/2009 |
| WO | WO2009088317 | 7/2009 |
| WO | WO2009106796 | 9/2009 |
| WO | WO2009141749 | 11/2009 |
| WO | WO2010117547 | 10/2010 |
| WO | WO2011024100 | 3/2011 |
| WO | WO2011129937 | 10/2011 |
| WO | WO2011143055 | 11/2011 |
| WO | WO2012001574 | 1/2012 |

OTHER PUBLICATIONS

Kirk-Othmer Enclyclopedia of Chemical Technology, vol. 7, pp. 297-299 (1965).

SPE 131783—Less Sand May Not be Enough, M. Curry, T. Maloney, R Woodroff, and R. Leonard, Feb. 23-25, 2010, SPR Unconventional Gas Conference, Pittsburg, PA, USA, pp. 1-14.

ARMA/USRMS 05-780—Experiments and numerical simulation of hydraulic fracturing in naturally fractured rock, C.J. De Pater and L.J.L. Beugelsdijk, Jun. 25-29, 2010, The 40th U.S. Symposium of Rock Mechanics (USRMS), Anchorage, AK, USA, 12 pages.

Nolte, K.G.: "Application of Fracture Design Based on Pressure Analysis," SPE13393—SPE Production Engineering, vol. 3, No. 1, 31-42, Feb. 1988.

Nolte, K.G. and Smith, M.B.: "Interpretation of Fracturing Pressures,"—SPE8297—JPT, vol. 12, No. 8, pp. 1767-1775, Sep. 1981.

Smith, M.B., Miller II, W.K., and Haga, J.: "Tip Screenout Fracturing: A Technique for Soft, Unstable Formations," SPE13273—SPE Production Engineering, vol. 2, No. 2, 95-103, May 1987.

Asgian, M.I., Cundall, P.A., and Brady, B.H. (1995) "Mechanical Stability of Porpped Hydraulic Fractures: A Numerical Study",—SPE28510—JPT, 203-208, Mar. 1995.

Milton-Tayler, D., Stephenson, C., and Asgian, M. (1992) "Factors Affecting the Stability of Proppant in Propped Fractures: Results of a Laboratory Study," paper SPE 24821 presented at the SPE Annual Technical Conference and Exhibition, Washington, DC, Oct. 4-7, pp. 571-579.

Thiercelin, M., et al. (1993) On the Modeling of Near Tip Processes in Hydraulic Fractures. International journal of rock mechanics and mining sciences & geomechanics abstracts, 30(7): pp. 537-540.

Desroches, J., et al. (1994) The Crack Tip Region in Hydraulic Fracturing. Proc. R. Soc. Lond. A, 447: p. 39-48.

Schlumberger CemCRETE Brochure (2003).

Schlumberger Cementing Services and Products—Materials, pp. 39-76 (2012).

SPE 119366—Fracture Design Considerations in Horizontal Wells Drilled in Unconventional Gas Reservoirs; Cipolla, C.L., Lolon, E.P., Mayerhofer, M.J., and Warpinski, N.R. (2009), pp. 1-10.

Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).

Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).

Economides M.J. and Nolte K.G., Reservoir Stimulation, John Wiley and Sons, Ltd, 3rd Edition New York, 2000—Chapter 5, "Basics of Hydraulic Fracturing" by M.B.Smith and J.W. Shlyapobersky, (pp. 5-1 to 5-28).

Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).

Aveyard et al; "Emulsions stabilised solely by colloidal particles"; Advances in Colloid and Interface Science 100-102 pp. 503-546 (2003).

Binks et al; "Pickering emulsions stabilized by monodisperse latex particles: Effects of particle size"; Langmuir vol. 17 . iss:15 p. 4540-4547 (2001).

Montagne etal; "Highly magnetic latexes from submicrometer oil in water ferrofluid emulsions"; Journal of polymer science. Part A, Polymer chemistry vol:44 iss:8 p. 2642-2656 (2006).

(56) References Cited

OTHER PUBLICATIONS

Park et al; "Rheological Properties and Stabilization of Magnetorheological Fluids in a Water-in-Oil Emulsion"; Journal of Colloid and Interface Science 240, 349-354 (2001).

Pickering, Su; "Emulsions" Journal of the Chemical Society vol. 91pp. 2001-2021 (1907).

Wang; "Design of Pickering Emulsion Templated Colloidosomes and Fundamentals of Emulsification with Nanoparticles" IPST Members Meeting, Apr. 10, 2012, Sven Research Group, 18 pages.

Zoppe et al.; "Pickering emulsions stabilized by cellulose nanocrystals grafted with thermo-responsive polymer brushes;" Journal of Colloid and Interface Science 369 (2012) pp. 202-209.

* cited by examiner

PICKERING EMULSION TREATMENT FLUID

BACKGROUND

The statements in this section merely provide background information related to the present disclosure and may not constitute prior art.

The use of treatment fluids in general, and high solids content treatment fluids in particular, may benefit from very good leak off control properties to inhibit fluid loss, as well as good stability, minimal settling of solids, suitable rheological properties for pumping with oilfield equipment, and/or good permeability of a solids pack after placement. Accordingly, there is a demand for further improvements in this area of technology.

SUMMARY

Control over fluid loss control and cleanup may be required when using HSCF and other systems. Treatment fluids may comprise emulsion droplets having various particle size distribution modes, which may be used as "particles" in a treatment fluid to provide leak off control of high solid concentration fluids, and the like. In an embodiment, the emulsion particles of a first liquid phase dispersed in a continuous second liquid phase are stabilized with colloidal particles adsorbed at the first liquid/second liquid interface in what is referred to as a "Pickering Emulsion" to produce a treatment fluid. In an embodiment, the colloidal particles comprise hydrolyzable particles. In an embodiment, the dispersed phase droplets have flexibility (pliability) to deform, thus seal non-exact size pore throats. The treatment fluid disclosed herein is suitable for use alone, or in combination with HSCF and other solid particle systems. In an embodiment, the dispersed phase droplets are labile, such that they may be removed or destroyed after well stimulation or the like to produce a permeable pack. The removal or destruction of the emulsion particles (i.e., the particles comprising the first liquid phase dispersed in the continuous second liquid phase which are stabilized with the colloidal particles adsorbed at the first liquid/second liquid interface) may result from diffusion of oil or another component to destroy the Pickering emulsion, via hydrolysis of the colloidal particles via pH modification, temperature changes, phase inversion, solvent solubility, surface property change, and/or the like.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE AN EMBODIMENTS

Figure 1:
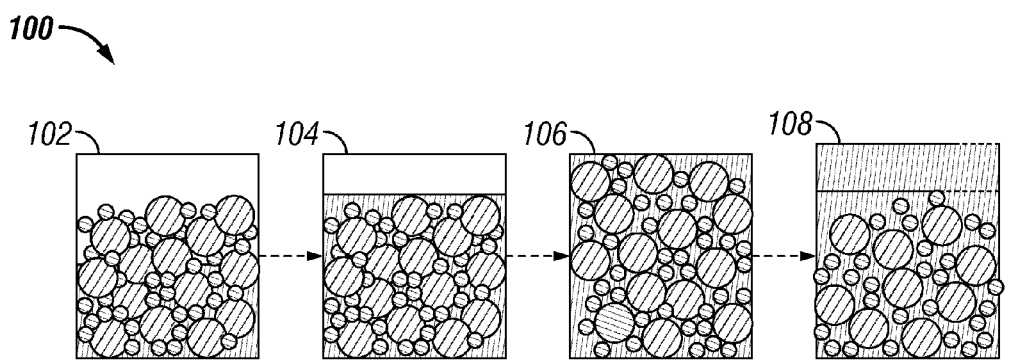
FIG. 1 shows a schematic slurry state progression chart for a treatment fluid according to some embodiments of the current application.

For the purposes of promoting an understanding of the principles of the disclosure, reference will now be made to some illustrative embodiments of the current application. Like reference numerals used herein refer to like parts in the various drawings.

As used herein, "an embodiment" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiment, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein.

It should be understood that, although a substantial portion of the following detailed description may be provided in the context of oilfield hydraulic fracturing operations, other oilfield operations such as cementing, gravel packing, etc., as well as non-oilfield well treatment operations can utilize and benefit as well from the instant disclosure.

As used herein, the terms "treatment fluid" or "wellbore treatment fluid" are inclusive of "fracturing fluid" or "treatment slurry" and should be understood broadly. These may be or include a liquid, a solid, a gas, and combinations thereof, as will be appreciated by those skilled in the art. A treatment fluid may take the form of a solution, an emulsion, slurry, or any other form as will be appreciated by those skilled in the art.

As used herein, "slurry" refers to an optionally flowable mixture of particles dispersed in a fluid carrier. The terms "flowable" or "pumpable" or "mixable" are used interchangeably herein and refer to a fluid or slurry that has either a yield stress or low-shear ($5.11\ s^{-1}$) viscosity less than 1000 Pa and a dynamic apparent viscosity of less than 10 Pa-s (10,000 cP) at a shear rate $170\ s^{-1}$, where yield stress, low-shear viscosity and dynamic apparent viscosity are measured at a temperature of 25° C. unless another temperature is specified explicitly or in context of use.

As used herein, the terms "Apollonianistic," "Apollonianistic packing," "Apollonianistic rule," "Apollonianistic particle size distribution," "Apollonianistic PSD" and similar terms refer to the particles present in the fluid in the absence of the carrier fluid having a multimodal volume-averaged particle size distribution with particle size distribution (PSD) modes that are not necessarily strictly Apollonian wherein either (1) a first PSD mode comprises particulates having a volume-averaged median size at least 1.5 times larger, or 3 times larger than the volume-average median size of at least a second PSD mode such that a packed volume fraction (PVF) (as defined herein) of the particulates present in the mixture exceeds 0.75 or (2) the particle mixture comprises at least three PSD modes, wherein a first amount of particulates have a first PSD mode, a second amount of particulates have a second PSD mode, and a third amount of particulates have a third PSD mode, wherein the first PSD mode is from 1.5 to 25 times, or from 2 to 10 times larger than the second PSD mode, and wherein the second PSD mode is at least 1.5 times larger than the third PSD mode.

In a powder or particulated medium, the packed volume fraction (PVF) is defined as the volume of space occupied by the particles (the absolute volume) divided by the bulk volume, i.e., the total volume of the particles plus the void space between them:

PVF=Particle volume/(Particle volume+Non-particle Volume)=1−ϕ

For the purposes of calculating PVF and slurry solids volume fraction (SVF) herein, the particle volume includes the volume of any colloidal and/or submicron particles.

Here, the porosity, (I), is the void fraction of the randomly packed particulates. Unless otherwise specified the PVF of a particulated medium is determined in the absence of overburden or other compressive force that would deform the packed particulates. The packing of particles (in the absence of overburden) is a purely geometrical phenomenon. Therefore, the PVF depends only on the size and the shape of the particles present in the fluid. The most ordered arrangement of monodisperse spheres (spheres with exactly the same size in a compact hexagonal packing) has a PVF of 0.74. However, such highly ordered arrangements of particles rarely occur in industrial operations. Rather, a somewhat random packing of particles is prevalent in oilfield treatment. Unless otherwise specified, particle packing in the current application means random packing of the particles. A random packing of the same spheres has a PVF of 0.64. In other words, the randomly packed particles occupy 64% of the bulk volume, and the void space occupies 36% of the bulk volume. A higher PVF can be achieved by preparing blends of particles that have more than one particle size distribution mode and/or a range(s) of particle sizes. The smaller particles can fit in the void spaces between the larger ones thus increasing the PVF of the particulates.

An Apollonianistic particle size distribution increases the PVF to above 0.74 by using a multimodal particle mixture, for example, coarse, medium and fine particles in specific volume ratios, where the smaller particles are selected to fit in the void spaces between the medium-size particles, and the medium size particles are selected to fit in the void space between the coarse particles. An Apollonianistic particle size distribution may, for example, include two consecutive size classes or modes, the ratio between the mean particle diameters ($d_{50}$) of each mode may be between 7 and 10. In such cases, the PVF can increase up to 0.95. By blending coarse particles (such as proppant) with other particles selected to increase the PVF, only a minimum amount of fluid phase (such as water) is needed to render the treatment fluid pumpable.

For purposes herein, the slurry solid volume fraction (SVF) is defined as

SVF=Particle volume/(Particle volume+Liquid volume)

Accordingly, the SVF/PVF ratio is equal to:

SVF/PVF=(Particle volume+Non-particle Volume)/ (Particle volume+Liquid volume)

It is helpful for an understanding of the current application to consider the amounts of particles present in the slurries of various embodiments of the treatment fluid. The minimum amount of fluid phase necessary to make a homogeneous slurry blend is the amount required to just fill all the void space in the PVF with the continuous phase, i.e., when SVF=PVF, or stated another way, when the liquid volume is equal to the void fraction of the randomly packed particulates. However, this blend may not be flowable since all the solids and liquid may be locked in place with no room for slipping and mobility. In flowable system embodiments, SVF may be lower than PVF, e.g., SVF/PVF≤0.99. In other words, the void volume may be less than the liquid volume. In this condition, essentially all the voids are filled with excess liquid to increase the spacing between particles so that the particles can roll or flow past each other. In an embodiment, the higher the PVF, the lower the SVF/PVF ratio should be to obtain a flowable slurry i.e., more fluid is present than necessary to file the void volume of the randomly packed particles.

FIG. 1 shows a slurry state progression chart for a system 100 having a particle mix with added fluid phase. The first fluid 102 does not have enough liquid added to fill the pore spaces of the particles, or in other words the SVF/PVF is greater than 1.0. The first fluid 102 is not flowable. The second fluid 104 has just enough fluid phase to fill the pore spaces of the particles, or in other words, the SVF/PVF is equal to 1.0. Testing determines whether the second fluid 104 is flowable and/or pumpable, but a fluid with an SVF/PVF of 1.0 is generally not flowable or barely flowable due to an excessive apparent viscosity and/or yield stress. The third fluid 106 has slightly more fluid phase than is required to fill the pore spaces of the particles, or in other words the SVF/PVF is just less than 1.0. A range of SVF/PVF values less than 1.0 will generally be flowable and/or pumpable or mixable, and if it does not contain too much fluid phase (and/or contains an added viscosifier) the third fluid 106 is stable. The values of the range of SVF/PVF values that are pumpable, flowable, mixable, and/or stable are dependent upon, without limitation, the specific particle mixture, fluid phase viscosity, the PVF of the particles, and the density of the particles. Simple laboratory testing of the sort ordinarily performed for fluids before fracturing treatments can readily determine the stability (e.g., the stability test as described herein) and flowability (e.g., apparent dynamic viscosity at 170 $s^{-1}$ and 25° C. of less than about 10,000 mPa-s).

The fourth fluid 108 shown in FIG. 1 has more fluid phase than the third fluid 106, to the point where the fourth fluid 108 is flowable but is not stabilized and settles, forming a layer of free fluid phase at the top (or bottom, depending upon the densities of the particles in the fourth fluid 108). The amount of free fluid phase and the settling time over which the free fluid phase develops before the fluid is considered unstable are parameters that depend upon the specific circumstances of a treatment. For example, if the settling time over which the free liquid develops is greater than a planned treatment time, then in one example the fluid would be considered stable. Other factors, without limitation, that may affect whether a particular fluid remains stable include the amount of time for settling and flow regimes (e.g. laminar, turbulent, Reynolds number ranges, etc.) of the fluid flowing in a flow passage of interest or in an agitated vessel, e.g., the amount of time and flow regimes of the fluid flowing in the wellbore, fracture, etc., and/or the amount of fluid leakoff occurring in the wellbore, fracture, etc. A fluid that is stable for one fracturing treatment may be unstable for a second fracturing treatment. The determination that a fluid is stable at particular conditions may be an iterative determination based upon initial estimates and subsequent modeling results.

For purposes herein, the Apollonianistic particle size distribution of emulsified particles which are not solids, but which are, in-fact, liquid droplets of a discontinuous liquid phase dispersed in a continuous liquid phase assumes that the particles are spherical, and are not deformed when incorporated into a pack. However, in describing the packed volume occupied by a plurality of particle size distribution modes which include emulsion particles, the treatment fluid may be characterized according to a dispersed particle volume fraction (DPVF), which refers to the volume fraction of a fluid occupied by the dispersed particles including emulsified liquids, solids, and the like. Accordingly, for purposes herein, the DPVF is defined as the ratio of the packed volume fraction (PVF) of all the particulates divided by the total volume of the fluid. A particle emulsion comprising particles having an Apollonianistic particle size distribution (of particles) is defined as having a DPVF of at least 40%, or at least 50%, or at least 60%, or at least 70%, or at least 80%, or at least 90%, or at least 95%.

"Viscosity" as used herein unless otherwise indicated refers to the apparent dynamic viscosity of a fluid at a temperature of 25° C. and shear rate of 170 s$^{-1}$. "Low-shear viscosity" as used herein unless otherwise indicated refers to the apparent dynamic viscosity of a fluid at a temperature of 25° C. and shear rate of 5.11 s$^{-1}$. Yield stress and viscosity of the treatment fluid are evaluated at 25° C. in a Fann 35 rheometer with an R1B5F1 spindle, or an equivalent rheometer/spindle arrangement, with shear rate ramped up to 255 s$^{-1}$ (300 rpm) and back down to 0, an average of the two readings at 2.55, 5.11, 85.0, 170 and 255 s$^{-1}$ (3, 6, 100, 200 and 300 rpm) recorded as the respective shear stress, the apparent dynamic viscosity is determined as the ratio of shear stress to shear rate ($\tau/\gamma$) at $\gamma=170$ s$^{-1}$, and the yield stress ($\tau_0$) (if any) is determined as the y-intercept using a best fit of the Herschel-Bulkley rheological model, $\tau=\tau_0+k(\gamma)^n$, where $\tau$ is the shear stress, k is a constant, $\gamma$ is the shear rate and n is the power law exponent. Where the power law exponent is equal to 1, the Herschel-Bulkley fluid is known as a Bingham plastic. Yield stress as used herein is synonymous with yield point and refers to the stress required to initiate flow in a Bingham plastic or Herschel-Buckley fluid system calculated as the y-intercept in the manner described herein. A "yield stress fluid" refers to a Herschel-Bulkley fluid system, including Bingham plastics or another fluid system in which an applied non-zero stress as calculated in the manner described herein is required to initiate fluid flow.

For purposes herein "contact angle" refers to the angle, conventionally measured through the liquid of the continuous phase, where a liquid interface meets a solid surface. It quantifies the wettability of a solid surface by a liquid via the Young equation:

$$\theta_c = \arccos\left(\frac{r_A \cos\theta_A + r_R \cos\theta_R}{r_A + r_R}\right)$$

wherein $\theta_A$ is the maximal contact angle;
$\theta_R$ is the minimal contact angle; and $$r_A = \left(\frac{\sin^3\theta_A}{2-3\cos\theta_A+\cos^3\theta_A}\right)^{1/3};$$

$$r_R = \left(\frac{\sin^3\theta_R}{2-3\cos\theta_R+\cos^3\theta_R}\right)^{1/3}$$

Figure 4:
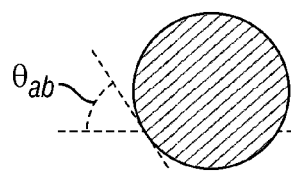
FIG. 4 shows a contact angle of less than 90° of a spherical particle adsorbed to a liquid-liquid interface according to an embodiment of the current application.
Figure 5:
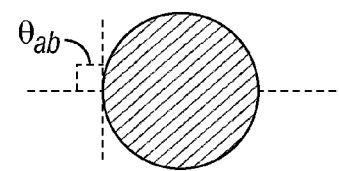
FIG. 5 shows a contact angle of 90° of a spherical particle adsorbed to a liquid-liquid interface according to an embodiment of the current application.
Figure 6:
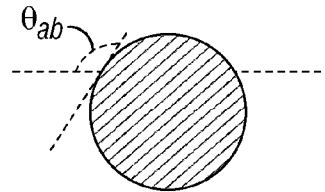
FIG. 6 shows a contact angle of greater than 90° of a spherical particle adsorbed to a liquid-liquid interface according to an embodiment of the current application.

A contact angle "θ" of greater than 0° and less than 90° is shown in FIG. 4, a contact angle θ of 90° is shown in FIG. 5, and a contact angle θ of greater than 90° is shown in FIG. 6. For purposes herein, a contact angle θ of 0 indicates perfect wettability; a contact angle θ of greater than 0 and less than 90° indicates high wettability; a contact angle θ of greater than or equal to 90° and less than 150° indicates low wettability; and a contact angle θ of 180° indicates a perfectly non-wetting interaction.

In an embodiment, the contact angle can be measured using the gel-trapping technique as described by technique as described by Paunov (Langmuir, 2003, 19, 7970-7976) or alternatively by using commercial contact angle measurement apparatus such as the Dataphysics OCA20, or other suitable instrumentation.

For purposes herein, a "Pickering emulsion" refers to an emulsion comprising a first liquid phase dispersed in a second continuous liquid phase that is stabilized by solid particles (for example colloidal silica) which adsorb onto the interface between the two phases, as described by Ramsden, W. *Separation of Solids in the Surface-Layers of Solutions and 'Suspensions'* (See. Ramsden, W., Proc. R. Soc. London 1903, 72, 156-164; and Pickering, S.U. Emulsions. J. Chem. Soc. 1907, 91, 2001-2021).

For purposes herein, a particle may be substantially round and spherical, and/or may have varying degrees of sphericity and roundness, according to the API RP-60 sphericity and roundness index. Particles may be described according to an aspect ratio, which for purposes herein is defined as the ratio of the longest dimension of the particle to the shortest dimension of the particle.

The measurement or determination of the viscosity of the liquid phase (as opposed to the treatment fluid or base fluid) may be based on a direct measurement of the solids-free liquid, or a calculation or correlation based on a measurement(s) of the characteristics or properties of the liquid containing the solids, or a measurement of the solids-containing liquid using a technique where the determination of viscosity is not affected by the presence of the solids. As used herein, solids-free for the purposes of determining the viscosity of the liquid phase means in the absence of non-colloidal particles larger than 1 micron such that the particles do not affect the viscosity determination, but in the presence of any sub-micron or colloidal particles that may be present to thicken and/or form a gel with the liquid, i.e., in the presence of ultrafine particles that can function as a thickening agent. In an embodiment, a "low viscosity liquid phase" means a viscosity less than about 300 mPa-s measured without any solids greater than 1 micron at 170 s$^{-1}$ and 25° C.

In an embodiment, the treatment fluid may include a continuous fluid phase, also referred to as an external phase, and a discontinuous phase(s), also referred to as an internal phase(s), which may be a fluid (liquid or gas) in the case of an emulsion, foam or energized fluid, or which may be a solid in the case of a slurry. The continuous fluid phase may be any matter that is substantially continuous under a given condition. Examples of the continuous fluid phase include, but are not limited to, water, hydrocarbon, gas, liquefied gas, etc., which may include solutes, e.g. the fluid phase may be a brine, and/or may include a brine or other solution(s). In an embodiment, the fluid phase(s) may optionally include a viscosifying and/or yield point agent and/or a portion of the total amount of viscosifying and/or yield point agent present. Some non-limiting examples of the fluid phase(s) include hydratable gels (e.g. gels containing polysaccharides such as guars, xanthan and diutan, hydroxyethylcellulose, polyvinyl alcohol, other hydratable polymers, colloids, etc.), a cross-linked hydratable gel, a viscosified acid (e.g. gel-based), an emulsified acid (e.g. oil outer phase), an energized fluid (e.g., an $N_2$ or $CO_2$ based foam), a viscoelastic surfactant (VES) viscosified fluid, and an oil-based fluid including a gelled, foamed, or otherwise viscosified oil.

In an embodiment, the particles in the treatment fluids may be multimodal. As used herein multimodal refers to a plurality of particle sizes or modes which each has a distinct size or particle size distribution, e.g., proppant and fines. As used herein, the terms distinct particle sizes, distinct particle size distribution, or multi-modes or multimodal, mean that each of the plurality of particles has a unique volume-averaged particle size distribution (PSD) mode. That is, statistically, the particle size distributions of different particles appear as distinct peaks (or "modes") in a continuous probability distribution function. For example, a mixture of two particles having normal distribution of particle sizes with similar variability is considered a bimodal particle mixture if their respective means differ by more than the sum of their respective standard deviations, and/or if their respective means differ by a statistically significant amount. In an embodiment, the particles contain a bimodal mixture of two particles; in an embodiment, the particles contain a trimodal mixture of three particles; in an embodiment, the particles contain a tetramodal mixture of four particles; in an embodiment, the particles contain a pentamodal mixture of five particles, and so on. Representative references disclosing multimodal particle mixtures include U.S. Pat. No. 5,518,996, U.S. Pat. No. 7,784,541, U.S. Pat. No. 7,789,146, U.S. Pat. No. 8,008,234, U.S. Pat. No. 8,119,574, U.S. Pat. No. 8,210,249, US 2010/0300688, US 2012/0000641, US 2012/0138296, US 2012/0132421, US 2012/0111563, WO 2012/054456, US 2012/0305245, US 2012/0305254, US 2012/0132421, PCT/RU2011/000971 and U.S. Ser. No. 13/415,025, each of which are hereby incorporated herein by reference.

"Proppant" refers to particulates that are used in well workovers and treatments, such as hydraulic fracturing operations, to hold fractures open following the treatment, of a particle size mode or modes in the slurry having a weight average mean particle size greater than or equal to about 100 microns, e.g., 140 mesh particles correspond to a size of 105 microns, unless a different proppant size is indicated in the claim or a smaller proppant size is indicated in a claim depending therefrom.

"Gravel" refers to particles used in gravel packing, and the term is synonymous with proppant as used herein. "Sub-proppant" or "subproppant" refers to particles or particle size or mode (including colloidal and submicron particles) having a smaller size than the proppant mode(s); references to "proppant" exclude subproppant particles and vice versa. In an embodiment, the sub-proppant mode or modes each have a weight average mean particle size less than or equal to about one-half of the weight average mean particle size of a smallest one of the proppant modes, e.g., a suspensive/stabilizing mode.

The proppant, when present, can be naturally occurring materials, such as sand grains. The proppant, when present, can also be man-made or specially engineered, such as coated (including resin-coated) sand, modulus of various nuts, high-strength ceramic materials like sintered bauxite, etc. In an embodiment, the proppant of the current application, when present, has a density greater than 2.45 g/mL, or greater than 3 g/mL, or greater than 3.25 g/mL, e.g., 2.5-3.5 g/mL, such as sand, ceramic, sintered bauxite or resin coated proppant. In an embodiment, the proppant of the current application, when present, has a density less than or equal to 2.45 g/mL, such as less than about 1.60 g/mL, less than about 1.50 g/mL, less than about 1.40 g/mL, less than about 1.30 g/mL, less than about 1.20 g/mL, less than 1.10 g/mL, or less than 1.00 g/mL, such as light/ultralight proppant from various manufacturers, e.g., hollow proppant.

In an embodiment, the treatment fluid comprises a particle emulsion comprising an Apollonianistic particle size distribution of particles of a first liquid phase dispersed in a continuous second liquid phase, the particles comprising a plurality of colloidal particles adsorbed to a liquid-liquid interface between the first liquid phase and the second liquid phase.

In an embodiment, the treatment fluid comprises a particle emulsion comprising particles of a first liquid phase dispersed in a continuous second liquid phase, and comprising a plurality of hydrolyzable colloidal particles adsorbed to a liquid-liquid interface between the first liquid phase and the second liquid phase.

In an embodiment, the colloidal particles have a particle size distribution mode from 0.005 to 100 microns. In an embodiment, the colloidal particles comprise an aspect ratio from 1.1 to about 1000. In an embodiment, the colloidal particles comprise a contact angle of about 20° to about 150°, or about 60° to about 120°, when determined at the colloidal particle/first liquid phase/second liquid phase boundary. In an embodiment, the colloidal particles have an average length from about 0.001 microns to about 100 microns.

In an embodiment, the colloidal particles are hydrolyzable. In an embodiment, the colloidal particles comprise wax, $C_1$-$C_{20}$ aliphatic polyester, polylactic acid, polyglycolic acid, polycaprolactone, polyhydroxybutyrate, polyhydroxybutyrate-valerate copolymer, $C_1$-$C_{20}$ aliphatic polycarbonate, polyphosphazene, polysaccharide, dextran, cellulose, chitin, chitosan, protein, polyamino acid, polyethylene oxide, microcrystalline cellulose, natural plant fibers, silk, stearic acid, polyvinyl pyrrolidone, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, iron oxides, copper oxides, aluminum oxide, precipitated silica, fumed silica, or a combination thereof.

In an embodiment, the colloidal particles comprise fibers having an aspect ratio from about 10 to about 1000, which have been modified to comprise a contact angle of about 60° to about 120°, when determined at the hydrolyzable colloidal particle/first liquid phase/second liquid phase boundary. In an embodiment, the hydrolyzable colloidal particle fibers comprise microcrystalline cellulose, natural plant fibers, silk, stearic acid, polyhydroxybutyrate-valerate polymer, polyvinyl pyrrolidone polymer, polycaprolactone polymer, polylactic acid, polyglycolic acid, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, or a combination thereof.

In an embodiment, the treatment fluid may further comprise at least one Ostwald ripening inhibitor which is soluble or miscible in the first phase or which itself serves as the first phase. In an embodiment, the treatment fluid may comprise from 1 to 20 parts per 100 parts by weight of one or more of a dispersant, a surfactant, a viscosifier, a defoamer, or a combination thereof, based on the total amount of the carrier fluid present in the treatment fluid.

In an embodiment, the treatment fluid may comprise an Apollonianistic solids mixture, wherein at least one particle size distribution mode comprises the Pickering emulsion particles, i.e., the particles comprising the first liquid phase stabilized by the colloidal particles. In an embodiment, the Apollonianistic solids mixture comprises first and second particle size distribution modes wherein the first particle size distribution mode is at least three times larger than the second particle size distribution mode such that a PVF of the solids mixture exceeds 0.75. In an embodiment, the first particle size distribution mode is smaller than a particle size distribution mode of a proppant. In an embodiment, the treatment fluid may further comprise a solids mixture comprising hydrolyzable particles, wherein the hydrolyzable particles may be present as colloidal particles adsorbed at the first liquid/second liquid interface, and/or freely dispersed in the continuous phase, as particles having one or more particle size distribution modes of an Apollonianistic solids mixture, or a combination thereof.

Fluid loss control is a concern in utilization of HSCF and other solid systems since small amount of fluid loss may render the fluid immobile. Fluid loss control for HSCF and other systems may be achieved by a variety of methods. One method is to construct the HSCF following a certain particle size distribution, where the holes created by bigger particles are filled by smaller particles. It has been demonstrated that if the particles construction follows Apollonian packing parameters, good leak off control can be achieved. Another method includes use of polymeric materials e.g., latex, where upon enough pressure differentials; the latex or other polymer will film and form an impermeable barrier.

For Apollonian packing of particles to stop fluid loss, the particle sizes need to extend to a few nanometer size when the gap or capillaries formed in these packing system will become small enough that close to 10,000 psi capillary force is present. This pressure is typically suitable to stop fluid loss. Forming an ideal gradient for the particles to achieve the fluid loss control is problematic. In addition, the small particles may need to be removed to produce a pack having permeability to improve fluid production. Latex is problematic in this respect. Treatment fluids comprising Pickering emulsion according to an embodiment disclosed herein may be utilized as part of an Apollonian packing, and the colloidal particles may function as one or more of the fluid control agents.

In an embodiment, the Pickering emulsion particles have a particle size distribution of greater than or equal to about 1 micron, or from about 1 micron to about 100 microns. As such, in an embodiment, the Pickering emulsion particles fill the medium particle size distribution typically required for Apollonian packing suitable for stopping fluid loss in treatment fluids. However, in an embodiment, the free colloidal particles (those which are present in excess of those adsorbed at the first liquid/second liquid interface) that are present in a treatment fluid may function as one or more of the small particles PSD modes in the Apollonian packing to stop fluid loss.

In an embodiment, the Pickering emulsion particles have a particle size distribution mode in a size range above what would be produced by a typical emulsion. However, since the Pickering emulsion particles are fluid, they may fill interstices between proppant or other particles, and the colloidal particles may then fill the remaining interstices to complete the Apollonian packing. In an embodiment, the treatment fluid may comprise an Apollonianistic particle size distribution comprising, or consisting essentially of a proppant, one or more PSD modes comprising a Pickering emulsion, and colloidal particles, wherein the Pickering emulsion comprises particles of a first liquid phase dispersed in a continuous second liquid phase, and comprising a plurality of a portion of the colloidal particles adsorbed to a liquid-liquid interface between the first liquid phase and the second liquid phase. In such an embodiment everything present can be flowable, or everything can be flowable except the proppant, providing facile cleanup without having to degrade any of the particles present.

In an embodiment, the Pickering emulsion particles may be "broken" by mere alteration of the surface properties to break the emulsion present in the fluid. In and embodiment, the viscosity and/or composition of the continuous phase may be manipulated to break the emulsion and thus, remove particles present in a downhole pack or the like In an embodiment, a treatment fluid comprises a Pickering emulsion, which comprises particles having a particle size distribution mode from about 0.5 micron to about 500 microns. In an embodiment, a treatment fluid comprises a Pickering emulsion, which comprises particles having a particle size distribution mode of greater than or equal to about 1 micron, or greater than or equal to about 5 microns, or greater than or equal to about 10 microns, or greater than or equal to about 50 microns, and having a particle size distribution mode of less than or equal to about 100 microns, or less than or equal to about 50 microns, or less than or equal to about 10 microns.

In an embodiment, a treatment fluid comprises a Pickering emulsion, which comprises solid colloidal particles of intermediate wettability (i.e., having a contact angle from about 60° to about 120° at a boundary of the colloidal particle/first liquid phase/second liquid phase interface) in a size range from about 5 nanometers to about 100 micrometers, which are absorbed or otherwise attached to a liquid-liquid interface of a first liquid phase dispersed in a second continuous liquid phase, to provide emulsion stability.

In an embodiment, a treatment fluid comprises a plurality of colloidal particles having a particle size distribution mode from about 0.005 microns to about 100 microns. In an embodiment, a treatment fluid comprises colloidal particles having a particle size distribution mode of greater than or equal to about 0.01 microns, or greater than or equal to about 0.05 microns, or greater than or equal to about 0.1 microns, or greater than or equal to about 0.5 microns, and having a particle size distribution mode of less than or equal to about 10 microns, or less than or equal to about 5 microns, or less than or equal to about 1 micron. In an embodiment, at least a portion of the colloidal particles present in the fluid are absorbed or otherwise attached to a liquid-liquid interface of a first liquid phase dispersed in a second continuous liquid phase, and at least a portion of the colloidal particles present in the fluid is freely dispersed in the fluid.

Accordingly, in an embodiment, at least a portion of the plurality of colloidal particles is freely dispersed in the second liquid phase, and which comprises at least one particle size distribution mode of an Apollonianistic particle size distribution present in the treatment fluid. For purposes herein, the plurality of colloidal particles freely dispersed in the second liquid phase refers to colloidal particles which are not present, or which have not adsorbed to the liquid/liquid interface between the first liquid phase and the second liquid phase, but instead are merely dispersed as discrete particles in the second liquid phase.

In an embodiment, the colloidal particles must be selected to comprise an appropriate size, wettability and concentration in the emulsion in order for particles to stabilize the Pickering emulsion. In an embodiment, the colloidal particles may be present in an amount which exceeds the amount required to stabilize the emulsion, such that the freely dispersed colloidal particles may function as fluid loss control agents, and/or the like. Other factors contributing to the stability of the emulsion may include the pH and presence of ions in the water phase as well as the presence of any other emulsifiers. In an embodiment, these factors may be manipulated to produce an inversion in the type of the emulsion or otherwise destroy the emulsion particles. The interactions of the particles with each other are also important. Accordingly, different kinds of particles may be selected to stabilize the emulsion depending on the type of emulsion (oil-in-water, water-in-oil) desired. In an embodiment, the particles may be treated to provide wetting of the particles to further stabilize the emulsion.

In an embodiment, the Pickering emulsions may be essentially free of a surfactant, comprising less than about 0.1 wt % based on the total weight of the emulsion, or may include one or more surfactants to provide wetting of the colloidal particles, dispersion of the discontinuous phase, and/or the like. In an embodiment, the Pickering emulsion comprises colloidal particles which comprise a hydrolyzable polymer, also referred to as a "labile polymer" or a "degradable polymer", which refers to a polymer in which the molecular weight is reduced by cleaving of at least some of the bonds between at least some of the polymerized monomers upon contact with a particular agent, i.e., a solvent, an acid, a base, an oxidizing agent, a reducing agent, or any combination thereof.

In an embodiment, the colloidal particle may comprise a metallic salt, oxide, or other inorganic compound which is degradable under various conditions of pH, temperature, solvent polarity, and/or the like. For purposes herein, a "hydrolyzable" colloidal particle, whether an inorganic moiety or a polymeric moiety, need not undergo actual chemical hydrolysis (i.e., the addition of water across a chemical bond), but may undergo cleavage of a chemical bond or crosslink reducing the overall molecular weight of the polymer, or size of the particle. Upon hydrolysis, a "hydrolyzable" or degradable colloidal particle may have an increased water solubility, and/or a reduction in actual size of the particle.

In an embodiment, the colloidal particles have a lower solubility in the dispersed phase relative to the continuous phase. In an embodiment, the colloidal particle has a solubility of less than 1 wt % in water at 25° C., or less than 0.1 wt % in water at 25° C. The colloidal particle may, however, be at least partially soluble or otherwise degraded by the environment in which the particle is located, including changing the pH in the environment, e.g., in the solids pack. For example, a polymeric colloidal particle may be insoluble at a neutral pH, but may become water soluble at a high, and/or at a low pH. In an embodiment, the colloidal particle is soluble in acidic fluids having a pH of less than 2, in basic fluids having a pH greater than 10, or a combination thereof. In an embodiment, the treatment fluid may further include an acid precursor, a base precursor, or the like, which is optionally sparingly soluble and/or encapsulated such that upon contact with a fluid, the acid or base is released after an appropriate time, thereby resulting in the at least partial removal of any hydrolyzable particles which may be present, which in-turn may destabilize the Pickering emulsion to remove the emulsion particles from a pack or other formation. In an embodiment, the colloidal particle is acid labile. In an embodiment the hydrolysis products of the colloidal particle may be water soluble.

In an embodiment, the colloidal particles comprise a hydrolyzable or otherwise labile polymer. In an embodiment, the hydrolyzable polymer comprises a polyester. In an embodiment, the colloidal particles comprise polylactic acid, polyglycolic acid, polycarprolactone, polybutylene succinate, polybutylene succinate-co-adipate, copolymers thereof, or a combination thereof. In an embodiment, the colloidal particles comprise a surface modified polymer.

In an embodiment, the Pickering emulsion and/or a treatment fluid comprising the Pickering emulsion according to an embodiment disclosed herein may be essentially free of surfactant. Accordingly, in an embodiment, the Pickering emulsion and/or a treatment fluid comprising the Pickering emulsion may comprise less than about 0.1 wt % of a surfactant.

In an embodiment, the emulsion may include one or more surfactants. Suitable surfactants include nonionic surfactants, which may be one or more of alkyl alcohol ethoxylates, alkyl phenol ethoxylates, alkyl acid ethoxylates, alkyl amine ethoxylates, sorbitan alkanoates, ethoxylated sorbitan alkanoates, or the like. The nonionic surfactant in an embodiment may be an alkoxylate such as octyl phenol ethoxylate or a polyoxyalkylene such as polyethylene glycol or polypropylene glycol, or a mixture of an alkoxylate or a plurality of alkoxylates with a polyoxyalkylene or a plurality of polyoxyalkylenes, e.g., a mixture of octyl phenol ethoxylate and polyethylene glycol. The nonionic surfactant may also function as a plasticizer.

In an embodiment, the continuous phase has a contact angle with the colloidal particles of less than 90° and the discontinuous phase has a contact angle with the colloidal particles of greater than or equal to 90°.

In an embodiment, the discontinuous phase has a contact angle with the colloidal particles of less than 90° and the continuous phase has a contact angle with the colloidal particles of greater than or equal to 90°.

Figure 7:
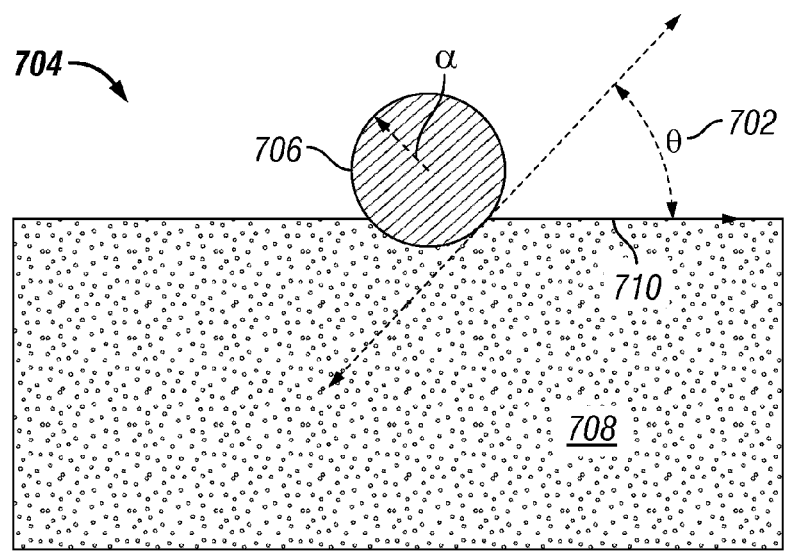
FIG. 7 shows the contact angle measurement of a spherical particle adsorbed to a liquid-liquid interface according to an embodiment of the current application.

As shown in FIG. 7, the contact angle $\theta$ (702) is measured at the colloidal particle/first liquid phase/second liquid phase boundary through the continuous second phase 704, (e.g., an aqueous phase) of a spherical particle 706 having a radius "a" present at the liquid-liquid interface 710 between the aqueous phase 704 and an first dispersed phase 708 (e.g., an oil phase).

Figure 8:
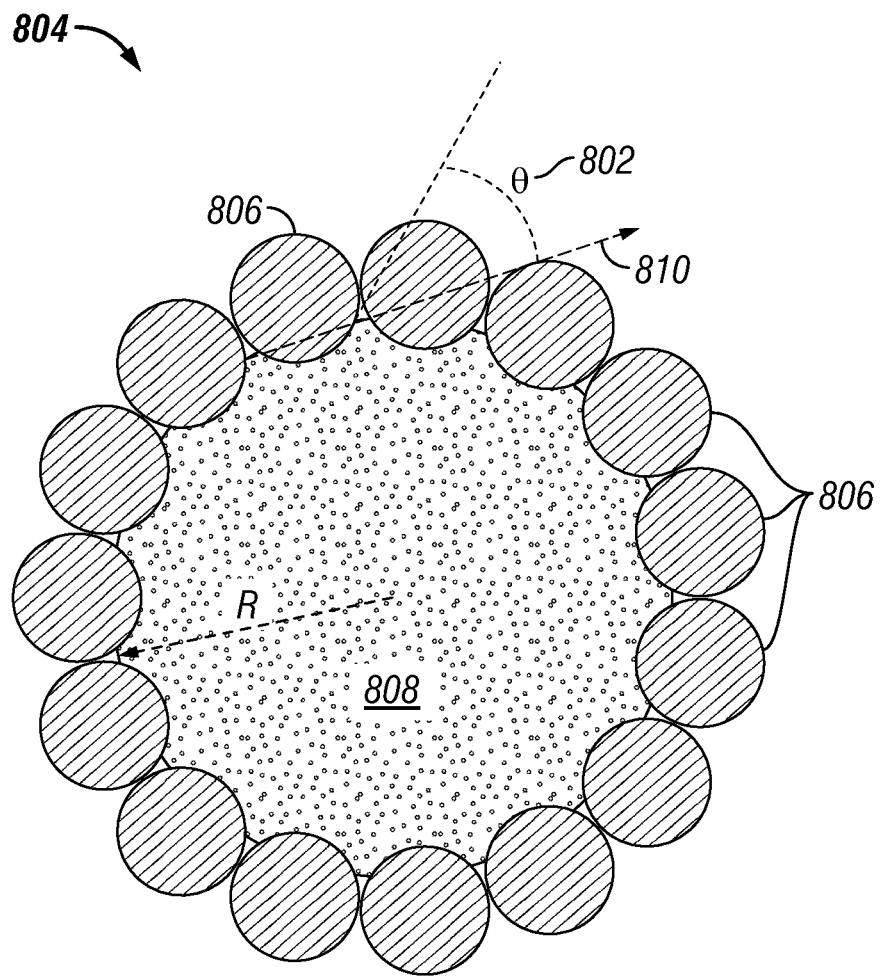
FIG. 8 shows a droplet of a first liquid phase dispersed in a continuous second liquid phase, and comprising a plurality of colloidal particles adsorbed to a liquid-liquid interface between the first liquid phase and the second liquid phase according to an embodiment of the current application.

FIG. 8 shows the contact angle 802 determined between a spherical particle (e.g., a droplet) having a radius "R" of a first liquid phase 808 dispersed, in a continuous second liquid phase 804, and comprising a plurality of colloidal particles 806 adsorbed to a liquid-liquid interface 810 between the first liquid phase 808 and the second liquid phase 804 according to an embodiment of the current application.

In an embodiment, the colloidal particles may have, or may have been modified so as to impart surface-active properties onto the particles to produce a contact angle from 0° to 150°, or greater than about 10°, or about 20°, or about 30°, or about 40°, or about 50°, about 60°, and less than or equal to about 140°, or about 130°, or about 120°, or about 100°, or about 90°. In an embodiment, the colloidal particles may have, or may have been modified so as to impart surface-active properties onto the particles to produce a contact angle from about 60° to about 120° with both the continuous phase and the discontinuous phase of the emulsion.

In an embodiment, the oil phase comprises a liquid with intermediate hydrophobicity so that it does not substantially dissolve or become miscible with water and is not so hydrophobic that the hydrolyzable colloidal particles are unable to efficiently contact both the oil and water phases and thus remain at the interface. In an embodiment, the oil phase has an octanol-water partition coefficient (or log P) above 1 and below 7, or below 5.

In an embodiment, the colloidal particles are selected to be small enough so that they can coat the surfaces of the dispersed phase droplets, sufficiently small for good dispersion stability against sedimentation when diluted for use and small enough to provide an even product distribution at the target site. The colloidal particles may also be selected to comprise sufficient affinity for both the liquids forming the dispersed and continuous phases such that they are able to adsorb to the liquid-liquid interface and thereby stabilize the emulsion.

This wetting characteristic, particle shape and suitability of colloidal particles for Pickering emulsion stabilization according to the instant disclosure may, in an embodiment, be readily assessed in formulations of sufficiently low viscosity (below about 2000 centipoise) to be useful in most fluids by combining the two immiscible liquid phases and the colloidal particle, and providing sufficient mechanical agitation to form an emulsion. If the resulting emulsion exhibits no substantial droplet coalescence over a period of 2 or more hours at a particular temperature, as determined by the growth of a liquid layer containing only the liquid that was earlier present in the disperse phase, then the colloidal particle may comprise sufficient affinity for the liquid-liquid interface to stabilize the Pickering emulsion of the instant disclosure against coalescence.

In an embodiment, the affinity of the colloidal particle for the liquid-liquid interface of a particular fluid can be increased, and the emulsion stability improved, by adding one or more water soluble electrolytes or non-electrolytes to the continuous aqueous phase, as may be readily determined by conventional experimental methods. It is also similarly possible to improve the affinity of the colloidal particle for the liquid-liquid interface by adding a co-solvent that partitions preferentially into the disperse phase, that is a co-solvent having a dispersed phase/continuous phase partition log P of greater than about 1, as may be readily determined by one of skill in the art.

A wide variety of solid materials may be used as colloidal particles for the treatment fluids according to the instant disclosure. In an embodiment, the colloidal particles may comprise carbon black, metal oxides, metal hydroxides, metal carbonates, metal sulfates, polymers which are insoluble in any of the components of the treatment fluids, silica, clays, and combinations thereof.

In an embodiment, the colloidal particles comprise wax, $C_1$-$C_{20}$ aliphatic polyester, polylactic acid, polyglycolic acid, polycaprolactone, polyhydroxybutyrate, polyhydroxybutyrate-valerate copolymer, $C_1$-$C_{20}$ aliphatic polycarbonate, polyphosphazene, polysaccharide, dextran, cellulose, chitin, chitosan, protein, polyamino acid, polyethylene oxide, microcrystalline cellulose, natural plant fibers, silk, stearic acid, polyvinyl pyrrolidone, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, iron oxides, copper oxides, aluminum oxide, precipitated silica, fumed silica, or a combination thereof.

In an embodiment, the colloidal particles may be characterized as having a low solubility in both the continuous and disperse liquid phases, i.e., below about 100 ppm at room temperature, and can be prepared at a suitable particle size, and have suitable wetting properties for the liquid-liquid interface as described herein. It is also possible that one or more particles of a PSD mode can serve as the colloidal particle.

In an embodiment, the colloidal particle may comprise a surface modified solid, for example fumed or precipitated silica modified by the presence of dimethyldichlorosilane, hexadecylsilane, aluminum oxide or by alkane decoration. Polymers suitable for use as colloidal particles include polymeric fibers which have been modified so as to impart surface-active properties onto the fibers, and the like.

In an embodiment, the polymeric fibers suitable for use as colloidal particles may have been modified so as to impart surface-active properties onto said fibres to produce a contact angle from 0° to 150°, or greater than about 10°, or about 20°, or about 30°, or about 40°, or about 50°, about 60°, and less than or equal to about 140°, or about 130°, or about 120°, or about 100°, or about 90°. In an embodiment, the polymeric fibers suitable for use as colloidal particles may have been modified so as to impart surface-active properties onto said fibres to produce a contact angle from about 60° to about 120° with both the continuous phase and the discontinuous phase of the emulsion.

In an embodiment, the colloidal particles, which include polymeric fibers, may comprise a rod-like (fibril) shape, and comprise a particle contact angle at an oil/water or air/water interface which is from about 60° to 120°, or about 85° to 90°. For purposes herein, "fibre" refers to any particulate structure having an aspect ratio between the length and the diameter ranges from 10 to infinite, wherein the diameter refers to the largest distance of the cross-section. The materials of the "fibre" substance can be organic, inorganic, polymeric/and/or macromolecular. In an embodiment the fibre topology may be liner or branched (star-like). The aspect ratio of a branched fiber being the ratio of the cross-section to the longest branch. In an embodiment, the rod-like structures may comprise an amphiphathic design to produce a balance between hydrophobicity and hydrophilicity.

In an embodiment, fibers suitable for use as colloidal particles have a length of 0.001 to 100 microns, or from 0.01 to 50 microns, or from 0.1 to 5 microns, of from 0.001 to less than 1 micron, and have a diameter is in the range of 0.001 to 10 microns. In an embodiment, fibers suitable for use as colloidal particles comprise an aspect ratio (length/diameter) of from greater than or equal to about 10, or 20, or 50, up to about 1000.

Specific examples of colloidal particles, modified or unmodified, include zinc oxide, iron oxide, copper oxide, titanium dioxide, aluminum oxide, calcium carbonate, precipitated silica and fumed silica, as well as mixtures thereof. In an embodiment, fibers, either modified or unmodified, which may be suitable for use as hydrolyzable colloidal particles comprise microcrystalline cellulose (MCC), natural plant fibers, including citrus fibres, onion fibres, silk and the like. Other examples of fibers suitable for use as colloidal particles may comprise stearic acid, polyhydroxybutyrate-valerate, polyvinyl pyrrolidone, polycaprolactone, their derivatives and copolymers, and other polymers that can be spun with diameters ranging from 0.001 to about 30 microns.

In an embodiment, inorganic fibers suitable for use as colloidal particles may comprise $CaCO_3$, $CaSO_4$, $ZnO$, $TiO_2$, $MgO$, $MgSO_4$, $Mg(OH)_2$, $Mg_2B_2O_5$, aluminium borate, potassium titanate, barium titanate, hydroxyapatite, attapulgite, as well as other inorganic crystals having fiber-like morphology.

In an embodiment, colloidal particles suitable for use herein may be modified to produce a contact angle in the range of between 60° and 120°, or between 70° and 110°, or between 80° and 100°, wherein the contact angle is the three-phase contact angle at the fibre/first phase/second phase interface, (e.g., fiber/oil/water interface).

In an embodiment, the modification of a fibre can be achieved by chemical or physical means. The chemical modification may include esterification or etherification by means of hydrophobic groups such as stearate, alkoxy groups, and the like as known to one of skill in the art. Suitable physical modifications include coating of the fibers with hydrophobic materials, for example ethylcellulose, hydroxypropyl-cellulose, waxes such as shellac, carnauba wax, bees wax, and the like, with fatty acids such as stearic acid, and the like, or combinations thereof. In an embodiment, colloidal particles may be coating using colloidal precipitation, e.g., using solvent or temperature change, and the like, and/or using "decoration" of rod like materials using hydrophobic nano-particles, for instance silica, as is readily understood by one having minimal skill in the art.

In an embodiment, the colloidal particles of the particle emulsion may comprise hydrolyzable materials, and/or may be selected to stabilize the particle emulsion for a particular period of time, a particular set of conditions, and/or the like, and then subsequently break down destabilizing the emulsion and thus, destabilizing the particles contained therein. In an embodiment, the colloidal particles comprise a hydrolyzable material, which may stable at neutral pH, but which may be acid soluble at a pH below about 1.5, and/or base soluble at a pH of greater than about 11.

Ostwald Ripening Inhibitor

In an embodiment, the particle emulsion may further comprise an Ostwald ripening inhibitor, which may be selected to stabilize the particle emulsion for a particular period of time, a particular set of conditions, and/or the like and then subsequently break down destabilizing the emulsion and thus, destabilizing the particles contained therein.

In an embodiment, Ostwald ripening inhibitors may be soluble or miscible in the disperse oil phase, or may themselves serve as the disperse oil phase. Ostwald ripening inhibitors have more affinity for the disperse oil phase than the continuous aqueous phase and preferably have a log P of 3 or higher. Suitable Ostwald ripening inhibitors include Ostwald ripening inhibitor solvents such as vegetable oils, methylated vegetable oils, mineral oils, liquid hydrocarbon solvents containing from 8 to 20 carbon atoms, petroleum hydrocarbons wherein 30 to 100 wt. % of the carbon structures of the hydrocarbons have a carbon number distribution in the range of $C_{22}$ to $C_{50}$ and polymeric stabilizers. Suitable Ostwald ripening inhibitor solvents may comprise very low solubility, preferably below 100 ppm at 50° C. in the aqueous phase, in order to remain in the disperse oil phase and not dissolve in the continuous aqueous phase.

In an embodiment, liquid hydrocarbon solvents suitable for use as Ostwald ripening inhibitors include paraffins, naphthenes and aromatics either as mixtures or as individual components. In an embodiment, suitable Ostwald ripening inhibitors comprise hydrocarbon solvents having greater than 50 wt. % paraffins, or at least 95 wt. %, or at least 98 wt. %, of the carbon structures of the hydrocarbon solvents have a carbon number distribution from $C_{10}$ to $C_{20}$, and/or comprise hydrocarbon solvents have an initial boiling point of at least 200° C., or at least 250° C., and a final boiling point of 325° C. or less at atmospheric pressure.

In an embodiment, Ostwald ripening inhibitors suitable for use herein include polymers or oligomers having a molecular weight of at least 200, or at least 400, and include polyolefins such as polyallene, polybutadiene, polyisoprene, and poly(substituted butadienes) such as poly(2-t-butyl-1,3-butadiene), poly(2-chlorobutadiene), poly(2-chloromethyl butadiene), polyphenylacetylene, polyethylene, chlorinated polyethylene, polypropylene, polybutene, polyisobutene, polybutylene oxides, or copolymers of polybutylene oxides with propylene oxide or ethylene oxide, polycyclopentylethylene, polycyclohexylethylene, polyacrylates including polyalkylacrylates and polyarylacrylates, polymethacrylates including polyalkylmethacrylates and polyarylmethacrylates, polydisubstituted esters such as poly(di-n-butylitaconate), and poly(amylfumarate), polyvinylethers such as poly(butoxyethylene) and poly(benzyloxyethylene), poly(methyl isopropenyl ketone), polyvinyl chloride, polyvinyl acetate, polyvinyl carboxylate esters such as polyvinyl propionate, polyvinyl butyrate, polyvinyl caprylate, polyvinyl laurate, polyvinyl stearate, polyvinyl benzoate, polystyrene, poly-t-butyl styrene, poly (substituted styrene), poly(biphenyl ethylene), poly(1,3-cyclohexadiene), polycyclopentadiene, polyoxypropylene, polyoxytetramethylene, polycarbonates such as poly(oxycarbonyloxyhexamethylene), polysiloxanes, in particular, polydimethyl cyclosiloxanes and organosoluble substituted polydimethyl siloxanes such as alkyl, alkoxy, or ester substituted polydimethylsiloxanes, liquid polysulfides, natural rubber and hydrochlorinated rubber, ethyl-, butyl- and benzyl-celluloses, cellulose esters such as cellulose tributyrate, cellulose tricaprylate and cellulose tristearate and natural resins such as colophony, copal and shellac, and combinations thereof.

In an embodiment, Ostwald ripening inhibitors suitable for use herein include polymers or co-polymers comprising styrene, alkyl styrenes, isoprene, butenes, butadiene, acrylonitrile, alkyl acrylates, alkyl methacrylates, vinyl chloride, vinylidene chloride, vinyl esters of lower carboxylic acids and alpha, beta-ethylenically unsaturated carboxylic acids and esters thereof.

In an embodiment, the Ostwald ripening inhibitor is selected from the group consisting of polystyrenes, polybutenes, for example polyisobutenes, polybutadienes, polypropylene glycol, polyalkyl(meth)acrylate e.g. polyisobutylacrylate or polyoctadecylmethacrylate, polyvinylesters e.g. polyvinylstearate, polystyrene/ethyl hexylacrylate copolymer, and polyvinylchloride, polydimethyl cyclosiloxanes, organic soluble substituted polydimethyl siloxanes such as alkyl, alkoxy or ester substituted polydimethylsiloxanes, polybutylene oxides or copolymers of polybutylene oxides with propylene and/or ethylene oxide, or combinations thereof.

In an embodiment, the Ostwald ripening inhibitor is selected from the group consisting of polypropylene, polyisobutylene, polyisoprene, copolymers of monoolefins and diolefins, polyacrylate, polystyrene, polyvinyl acetate, polyurethanes and polyamides.

In an embodiment, the Ostwald ripening inhibitor may be used as a pre-prepared polymer or oligomer. In an alternative embodiment, the Ostwald ripening inhibitor may be prepared in situ by polymerization of one or more appropriate monomers within the non-aqueous phase, after preparation of the dispersion. In an embodiment, the Ostwald ripening inhibitor may be employed in an amount of from 0.1 to 20%, preferably from 0.2 to 6% by weight of the dispersed phase of the particle emulsion.

Treatment Fluid and Method to Produce a Treatment Fluid

In an embodiment, a method, comprises dispersing a first liquid phase in a second liquid phase in the presence of a plurality of colloidal particles under conditions sufficient to produce a particle emulsion comprising particles of the first liquid phase dispersed in the continuous second liquid phase, and comprising at least a portion of the plurality of colloidal particles adsorbed to a liquid-liquid interface between the first liquid phase and the second liquid phase; mixing the particle emulsion in a carrier fluid to produce a treatment fluid; and circulating the treatment fluid into a wellbore.

In an embodiment, the method further comprises introducing Apollonianistic solids into the treatment fluid. In an embodiment, the method further comprises forming a pack of the solids in the wellbore. In an embodiment, the pack comprises proppant and at least one particle size distribution mode comprising particles of the dispersed first phase. In an embodiment, the pack comprises at least one particle size distribution mode comprising free colloidal particles. In an embodiment, the method may further comprise removing at least a portion of the particles from the pack to form a permeable proppant pack. In an embodiment, the method further comprises producing or injecting a fluid through the permeable proppant pack. In an embodiment, the permeable proppant pack is disposed in a fracture.

In an embodiment, the emulsion may be formed within a treatment fluid, or may be formed externally and added to a treatment fluid.

In an embodiment, the treatment fluid comprises an apparent specific gravity greater than 1.3, greater than 1.4, greater than 1.5, greater than 1.6, greater than 1.7, greater than 1.8, greater than 1.9, greater than 2, greater than 2.1, greater than 2.2, greater than 2.3, greater than 2.4, greater than 2.5, greater than 2.6, greater than 2.7, greater than 2.8, greater than 2.9, or greater than 3. The treatment fluid density can be selected by selecting the specific gravity and amount of the dispersed solids and/or adding a weighting solute to the aqueous phase, such as, for example, a compatible organic or mineral salt. In an embodiment, the aqueous or other liquid phase may have a specific gravity greater than 1, greater than 1.05, greater than 1.1, greater than 1.2, greater than 1.3, greater than 1.4, greater than 1.5, greater than 1.6, greater than 1.7, greater than 1.8, greater than 1.9, greater than 2, greater than 2.1, greater than 2.2, greater than 2.3, greater than 2.4, greater than 2.5, greater than 2.6, greater than 2.7, greater than 2.8, greater than 2.9, or greater than 3, etc.

In an embodiment, the aqueous or other liquid phase may have a specific gravity less than 1. In an embodiment, the weight of the treatment fluid can provide additional hydrostatic head pressurization in the wellbore at the perforations or other fracture location, and can also facilitate stability by lessening the density differences between the larger solids and the whole remaining fluid. In an embodiment, a low density proppant may be used in the treatment, for example, lightweight proppant (apparent specific gravity less than 2.65) having a density less than or equal to 2.5 g/mL, such as less than about 2 g/mL, less than about 1.8 g/mL, less than about 1.6 g/mL, less than about 1.4 g/mL, less than about 1.2 g/mL, less than 1.1 g/mL, or less than 1 g/mL. In an embodiment, the proppant or other particles in the slurry may have a specific gravity greater than 2.6, greater than 2.7, greater than 2.8, greater than 2.9, greater than 3, etc.

In an embodiment, the treatment fluid comprising a Pickering emulsion may be stable, or may be a stabilized treatment slurry. "Stable" or "stabilized" or similar terms refer to a stabilized treatment fluid or slurry wherein gravitational settling of the particles is inhibited such that no or minimal free liquid is formed, and/or there is no or minimal rheological variation among strata at different depths in the treatment fluid, and/or the slurry may generally be regarded as stable over the duration of expected treatment fluid storage and use conditions, e.g., a treatment fluid that passes a stability test or an equivalent thereof. In an embodiment, stability can be evaluated following different settling conditions, such as for example static under gravity alone, or dynamic under a vibratory influence, or dynamic-static conditions employing at least one dynamic settling condition followed and/or preceded by at least one static settling condition.

The static settling test conditions can include gravity settling for a specified period, e.g., 24 hours, 48 hours, 72 hours, or the like, which are generally referred to with the respective shorthand notation "24 h-static", "48 h-static" or "72 h static". Dynamic settling test conditions generally indicate the vibratory frequency and duration, e.g., 4 h@15 Hz (4 hours at 15 Hz), 8 h@5 Hz (8 hours at 5 Hz), or the like. Dynamic settling test conditions are at a vibratory amplitude of 1 mm vertical displacement unless otherwise indicated. Dynamic-static settling test conditions will indicate the settling history preceding analysis including the total duration of vibration and the final period of static conditions, e.g., 4 h@15 Hz/20 h-static refers to 4 hours vibration followed by 20 hours static, or 8 h@15 Hz/10 d-static refers to 8 hours total vibration, e.g., 4 hours vibration followed by 20 hours static followed by 4 hours vibration, followed by 10 days of static conditions. In the absence of a contrary indication, the designation "8 h@15 Hz/10 d-static" refers to the test conditions of 4 hours vibration, followed by 20 hours static followed by 4 hours vibration, followed by 10 days of static conditions. In the absence of specified settling conditions, the settling condition is 72 hours static. The stability settling and test conditions are at 25° C. unless otherwise specified.

In an embodiment, one stability test is referred to herein as the "8 h@15 Hz/10 d-static treatment fluid stability test", wherein a slurry sample is evaluated in a rheometer at the beginning of the test and compared against different strata of a slurry sample placed and sealed in a 152 mm (6 in.) diameter vertical gravitational settling column filled to a depth of 2.13 m (7 ft), vibrated at 15 Hz with a 1 mm amplitude (vertical displacement) two 4-hour periods the first and second settling days, and thereafter maintained in a static condition for 10 days (12 days total settling time). The 15 Hz/1 mm amplitude condition in this test is selected to correspond to surface transportation and/or storage conditions prior to the well treatment. At the end of the settling period the depth of any free water at the top of the column is measured, and samples obtained, in order from the top sampling port down to the bottom, through 25.4-mm sampling ports located on the settling column at 190 mm (6'3"), 140 mm (4'7"), 84 mm (2'9") and 33 mm (1'1"), and rheologically evaluated for viscosity and yield stress as described above.

As used herein, a stabilized treatment fluid may meet at least one of the following conditions:

(1) the slurry has a low-shear viscosity equal to or greater than 1 Pa-s (5.11 s$^{-1}$, 25° C.);
(2) the slurry has a Herschel-Bulkley (including Bingham plastic) yield stress equal to or greater than 1 Pa; or
(3) the largest particle mode in the slurry has a static settling rate less than 0.01 mm/hr; or
(4) the depth of any free fluid at the end of a 72-hour static settling test condition or an 8 h@15 Hz/10 d-static dynamic settling test condition (4 hours vibration followed by 20 hours static followed by 4 hours vibration followed finally by 10 days of static conditions) is no more than 2% of total depth; or (5) the apparent dynamic viscosity (25° C., 170 s$^{-1}$) across column strata after the 72-hour static settling test condition or the 8 h@15 Hz/10 d-static dynamic settling test condition is no more than +/−20% of the initial dynamic viscosity; or (6) the slurry solids volume fraction (SVF) across the column strata below any free water layer after the 72-hour static settling test condition or the 8 h@15 Hz/10 d-static dynamic settling test condition is no more than 5% greater than the initial SVF; or (7) the density across the column strata below any free water layer after the 72-hour static settling test condition or the 8 h@15 Hz/10 d-static dynamic settling test condition is no more than 1% of the initial density.

In an embodiment, the depth of any free fluid at the end of the 8 h@15 Hz/10 d-static dynamic settling test condition is no more than 2% of total depth, the apparent dynamic viscosity (25° C., 170 s$^{-1}$) across column strata after the 8 h@15 Hz/10 d-static dynamic settling test condition is no more than +/−20% of the initial dynamic viscosity, the slurry solids volume fraction (SVF) across the column strata below any free water layer after the 8 h@15 Hz/10 d-static dynamic settling test condition is no more than 5% greater than the initial SVF, and the density across the column strata below any free water layer after the 8 h@15 Hz/10 d-static dynamic settling test condition is no more than 1% of the initial density.

In an embodiment, the treatment slurry comprises at least one of the following stability indicia: (1) an SVF of at least 0.4 up to SVF=PVF; (2) a low-shear viscosity of at least 1 Pa-s (5.11 s$^{-1}$, 25° C.); (3) a yield stress (as determined herein) of at least 1 Pa; (4) an apparent viscosity of at least 50 mPa-s (170 s$^{-1}$, 25° C.); (5) a multimodal solids phase; (6) a solids phase having a PVF greater than 0.7; (7) a viscosifier selected from viscoelastic surfactants, in an amount ranging from 0.01 up to 7.2 g/L (60 ppt), and hydratable gelling agents in an amount ranging from 0.01 up to 4.8 g/L (40 ppt) based on the volume of fluid phase; (8) hydrolyzable colloidal particles; (9) a particle-fluid density delta less than 1.6 g/mL, (e.g., particles having a specific gravity less than 2.65 g/mL, carrier fluid having a density greater than 1.05 g/mL or a combination thereof); (10) particles having an aspect ratio of at least 6; (11) ciliated or coated proppant; and (12) combinations thereof. The slurry stabilization operations may be separate or concurrent, e.g., introducing a single viscosifier may also increase low-shear viscosity, yield stress, apparent viscosity, etc., or alternatively or additionally with respect to a viscosifier, separate agents may be added to increase low-shear viscosity, yield stress and/or apparent viscosity.

Decreasing the density difference between the particle and the carrier fluid may be done in an embodiment by employing porous particles, including particles with an internal porosity, i.e., hollow particles. However, the porosity may also have a direct influence on the mechanical properties of the particle, e.g., the elastic modulus, which may also decrease significantly with an increase in porosity. In an embodiment employing particle porosity, care should be taken so that the crush strength of the particles exceeds the maximum expected stress for the particle, e.g., in the an embodiment of proppants placed in a fracture the overburden stress of the subterranean formation in which it is to be used should not exceed the crush strength of the proppants.

In an embodiment, yield stress fluids, and also fluids having a high low-shear viscosity may be used to retard the motion of the carrier fluid and thus retard particle settling. The gravitational stress exerted by the particle at rest on the fluid beneath it must generally exceed the yield stress of the fluid to initiate fluid flow and thus settling onset. For a single particle of density 2.7 g/mL and diameter of 600 μm settling in a yield stress fluid phase of 1 g/mL, the critical fluid yield stress, i.e., the minimum yield stress to prevent settling onset, in this example is 1 Pa. The critical fluid yield stress might be higher for larger particles, including particles with size enhancement due to particle clustering, aggregation or the like.

Increasing carrier fluid viscosity in a Newtonian fluid also proportionally increases the resistance of the carrier fluid motion. In an embodiment, the fluid carrier has a lower limit of apparent dynamic viscosity, determined at 170 s$^{-1}$ and 25° C., of at least about 0.1 mPa-s, or at least about 1 mPa-s, or at least about 10 mPa-s, or at least about 25 mPa-s, or at least about 50 mPa-s, or at least about 75 mPa-s, or at least about 100 mPa-s, or at least about 150 mPa-s. A disadvantage of increasing the viscosity is that as the viscosity increases, the friction pressure for pumping the slurry generally increases as well. In an embodiment, the fluid carrier has an upper limit of apparent dynamic viscosity, determined at 170 s$^{-1}$ and 25° C., of less than about 300 mPa-s, or less than about 150 mPa-s, or less than about 100 mPa-s, or less than about 75 mPa-s, or less than about 50 mPa-s, or less than about 25 mPa-s, or less than about 10 mPa-s. In an embodiment, the fluid phase viscosity ranges from any lower limit to any higher upper limit.

In an embodiment, an agent may both viscosify and impart yield stress characteristics, and in further an embodiment may also function as a friction reducer to reduce friction pressure losses in pumping the treatment fluid. In an embodiment, the liquid phase is essentially free of viscosifier or comprises a viscosifier in an amount ranging from 0.01 up to 2.4 g/L (0.08–20 lb/1000 gals) of the fluid phase. The viscosifier can be a viscoelastic surfactant (VES) or a hydratable gelling agent such as a polysaccharide, which may be crosslinked. When using viscosifiers and/or yield stress fluids, it may be useful to consider the need for and if necessary implement a clean-up procedure, i.e., removal or inactivation of the viscosifier and/or yield stress fluid during or following the treatment procedure, since fluids with viscosifiers and/or yield stresses may present clean up difficulties in some situations or if not used correctly. In an embodiment, clean up can be effected using a breaker(s). In an embodiment, the slurry is stabilized for storage and/or pumping or other use at the surface conditions, and clean-up is achieved downhole at a later time and at a higher temperature, e.g., for some formations, the temperature difference between surface and downhole can be significant and useful for triggering degradation of the viscosifier, the particles, a yield stress agent or characteristic, and/or a breaker. Thus in an embodiment, breakers that are either temperature sensitive or time sensitive, either through delayed action breakers or delay in mixing the breaker into the slurry, can be useful.

In addition or as an alternative to increasing the viscosity of the carrier fluid (with or without density manipulation), increasing the volume fraction of the particles in the treatment fluid can also hinder movement of the carrier fluid. Where the particles are not deformable, the particles interfere with the flow of the fluid around the settling particle to cause hindered settling. The addition of a large volume fraction of particles can be complicated, however, by increasing fluid viscosity and pumping pressure, and increasing the risk of loss of fluidity of the slurry in the event of carrier fluid losses. In an embodiment, the treatment fluid has a lower limit of apparent dynamic viscosity, determined at 170 s$^{-1}$ and 25° C., of at least about 1 mPa-s, or at least about 10 mPa-s, or at least about 25 mPa-s, or at least about 50 mPa-s, or at least about 75 mPa-s, or at least about 100 mPa-s, or at least about 150 mPa-s, or at least about 300 mPa-s, and an upper limit of apparent dynamic viscosity, determined at 170 s$^{-1}$ and 25° C., of less than about 500 mPa-s, or less than about 300 mPa-s, or less than about 150 mPa-s, or less than about 100 mPa-s, or less than about 75 mPa-s, or less than about 50 mPa-s, or less than about 25 mPa-s, or less than about 10 mPa-s. In an embodiment, the treatment fluid viscosity ranges from any lower limit to any higher upper limit.

In an embodiment, the treatment fluid may be stabilized by introducing sufficient particles into the treatment fluid to increase the SVF of the treatment fluid, e.g., to at least 0.5.

In an embodiment, the proppant or other large particle mode settling in multimodal embodiments can, if desired, be minimized independently of the viscosity of the continuous phase. Therefore, in an embodiment little or no viscosifier and/or yield stress agent, e.g., a gelling agent, is required to inhibit settling and achieve particle transport, such as, for example, less than 2.4 g/L, less than 1.2 g/L, less than 0.6 g/L, less than 0.3 g/L, less than 0.15 g/L, less than 0.08 g/L, less than 0.04 g/L, less than 0.2 g/L or less than 0.1 g/L of viscosifier may be present in the treatment fluid.

Figure 2:
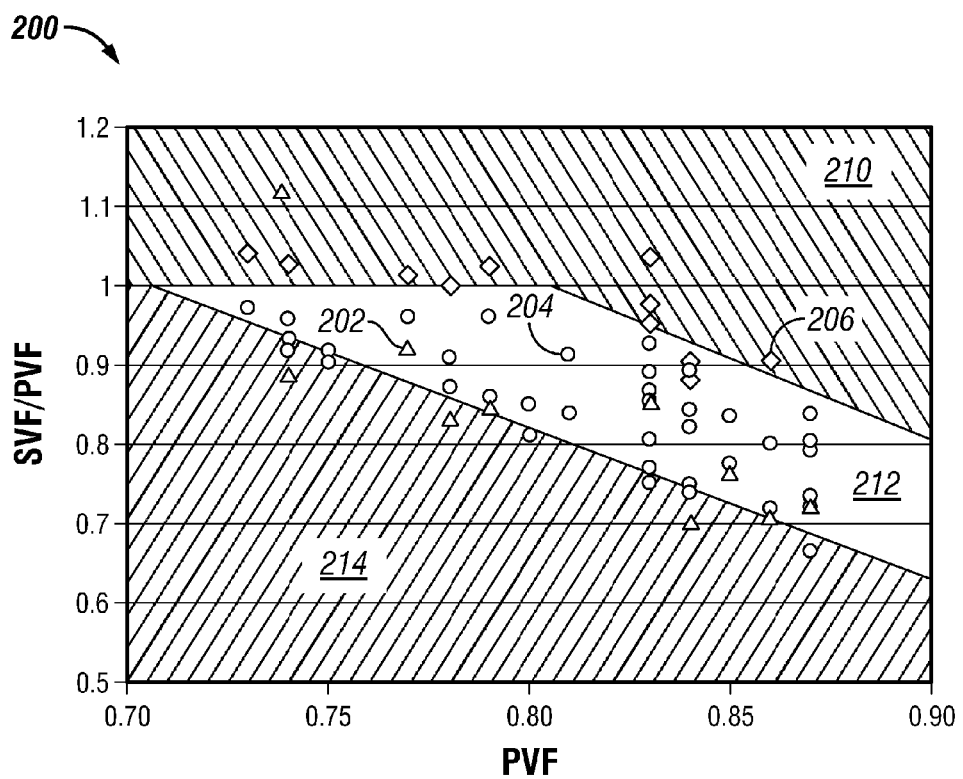
FIG. 2 illustrates fluid stability regions for a treatment fluid according to some embodiments of the current application.

FIG. 2 shows a data set 200 of various essentially Newtonian fluids without any added viscosifiers and without any yield stress, which were tested for the progression of slurry state on a plot of SVF/PVF as a function of PVF. The fluid phase in the experiments was water and the solids had specific gravity 2.6 g/mL. Data points 202 indicated with a triangle were values that had free water in the slurry, data points 204 indicated with a circle were slurriable fluids that were mixable without excessive free water, and data points 206 indicated with a diamond were not easily mixable liquid-solid mixtures. The data set 200 includes fluids prepared having a number of discrete PVF values, with liquid added until the mixture transitions from not mixable to a slurriable fluid, and then further progresses to a fluid having excess settling. At an example for a solids mixture with a PVF value near PVF=0.83, it was observed that around an SVF/PVF value of 0.95 the fluid transitions from an unmixable mixture to a slurriable fluid. At around an SVF/PVF of 0.7, the fluid transitions from a stable slurry to an unstable fluid having excessive settling. It can be seen from the data set 200 that the compositions can be defined approximately into a non-mixable region 210, a slurriable region 212, and a settling region 214.

FIG. 2 shows the useful range of SVF and PVF for slurries in an embodiment without gelling agents. In an embodiment, the SVF is less than the PVF, or the ratio SVF/PVF is within the range from about 0.6 or about 0.65 to about 0.95 or about 0.98. Where the liquid phase has a viscosity less than 10 mPa-s or where the treatment fluid is water essentially free of thickeners, in an embodiment PVF is greater than 0.72 and a ratio of SVF/PVF is greater than about 1−2.1*(PVF−0.72) for stability (non-settling). Where the PVF is greater than 0.81, in an embodiment a ratio of SVF/PVF may be less than 1−2.1*(PVF−0.81) for mixability (flowability). Adding thickening or suspending agents, or solids that perform this function such as calcium carbonate or colloids, i.e., to increase viscosity and/or impart a yield stress, in an embodiment allows fluids otherwise in the settling area 214 an embodiment (where SVF/PVF is less than or equal to about 1−2.1*(PVF−0.72)) to also be useful as an treatment fluid or in applications where a non-settling, slurriable/mixable slurry is beneficial, e.g., where the treatment fluid has a viscosity greater than 10 mPa-s, greater than 25 mPa-s, greater than 50 mPa-s, greater than 75 mPa-s, greater than 100 mPa-s, greater than 150 mPa-s, or greater than 300 mPa-s; and/or a yield stress greater than 0.1 Pa, greater than 0.5 Pa, greater than 1 Pa, greater than 10 Pa or greater than 20 Pa.

Introducing high-aspect ratio particles into the treatment fluid, e.g., particles having an aspect ratio of at least 6, represents additional or alternative an embodiment for stabilizing the treatment fluid. Examples of such non-spherical particles include, but are not limited to, fibers, flakes, discs, rods, stars, etc., as described in, for example, U.S. Pat. No. 7,275,596, US20080196896, which are hereby incorporated herein by reference. In an embodiment, introducing ciliated or coated proppant into the treatment fluid may stabilize or help stabilize the treatment fluid.

Proppant or other particles coated with a hydrophilic polymer can make the particles behave like larger particles and/or more tacky particles in an aqueous medium. The hydrophilic coating on a molecular scale may resemble ciliates, i.e., proppant particles to which hairlike projections have been attached to or formed on the surfaces thereof. Herein, hydrophilically coated proppant particles are referred to as "ciliated or coated proppant." Hydrophilically coated proppants and methods of producing them are described, for example, in WO 2011-050046, U.S. Pat. No. 5,905,468, U.S. Pat. No. 8,227,026 and U.S. Pat. No. 8,234,072, which are hereby incorporated herein by reference.

In some additional or alternative embodiments, the treatment fluid according the instant disclosure may have the benefit that the smaller particles in the voids of the larger particles act as slip additives like mini-ball bearings, allowing the particles to roll past each other without any requirement for relatively large spaces between particles. This property can be demonstrated in an embodiment by the flow of the treatment fluid through a relatively small slot orifice with respect to the maximum diameter of the largest particle mode of the treatment fluid, e.g., a slot orifice less than 6 times the largest particle diameter, without bridging at the slot, i.e., the slurry flowed out of the slot has an SVF that is at least 90% of the SVF of the treatment fluid supplied to the slot. In contrast, the slickwater technique requires a ratio of perforation diameter to proppant diameter of at least 6, and additional enlargement for added safety to avoid screen out usually dictates a ratio of at least 8 or 10 and does not allow high proppant loadings.

In an embodiment, the flowability of the treatment fluid through narrow flow passages such as perforations and fractures is similarly facilitated, allowing a smaller ratio of perforation diameter and/or fracture height to proppant size that still provides transport of the proppant through the perforation and/or to the tip of the fracture, i.e., improved flowability of the proppant in the fracture, e.g., in relatively narrow fracture widths, and improved penetration of the proppant-filled fracture extending away from the wellbore into the formation. These embodiments provide a relatively longer proppant-filled fracture prior to screenout relative to slickwater or high-viscosity fluid treatments.

As used herein, the "minimum slot flow test ratio" refers to a test wherein an approximately 100 mL slurry specimen is loaded into a fluid loss cell with a bottom slot opened to allow the test slurry to come out, with the fluid pushed by a piston using water or another hydraulic fluid supplied with an ISCO pump or equivalent at a rate of 20 mL/min, wherein a slot at the bottom of the cell can be adjusted to different openings at a ratio of slot width to largest particle mode diameter less than 6, and wherein the maximum slot flow test ratio is taken as the lowest ratio observed at which 50 vol % or more of the slurry specimen flows through the slot before bridging and a pressure increase to the maximum gauge pressure occurs. In an embodiment, the treatment fluid has a minimum slot flow test ratio less than 6, or less than 5, or less than 4, or less than 3, or a range of 2 to 6, or a range of 3 to 5.

Because of the relatively low water content (high SVF) of some embodiments of the treatment fluid, fluid loss may be a concern where flowability is important and SVF should at least be held lower than PVF, or considerably lower than PVF in some other embodiments. In conventional hydraulic fracturing treatments, there are two main reasons that a high volume of fluid and high amount of pumping energy have to be used, namely proppant transport and fluid loss. To carry the proppant to a distant location in a fracture, the treatment fluid has to be sufficiently turbulent (slickwater) or viscous (gelled fluid). Even so, only a low concentration of proppant is typically included in the treatment fluid to avoid settling and/or screen out. Moreover, when a fluid is pumped into a formation to initiate or propagate a fracture, the fluid pressure will be higher than the formation pressure, and the liquid in the treatment fluid is constantly leaking off into the formation. This is especially the case for slickwater operations. The fracture creation is a balance between the fluid loss and new volume created. As used herein, "fracture creation" encompasses either or both the initiation of fractures and the propagation or growth thereof. If the liquid injection rate is lower than the fluid loss rate, the fracture cannot be grown and becomes packed off. Therefore, traditional hydraulic fracturing operations may not be optimized for creating fractures in the formation.

In an embodiment of the treatment fluid comprising a Pickering emulsion where the SVF is high, even a small loss of carrier fluid may result in a loss of flowability of the treatment fluid, and in an embodiment it is therefore undertaken to guard against excessive fluid loss from the treatment fluid, at least until the fluid and/or proppant reaches its ultimate destination. In an embodiment, the treatment fluid may have an excellent tendency to retain fluid and thereby maintain flowability, i.e., it has a low leakoff rate into a porous or permeable surface with which it may be in contact. According to some embodiments of the current application, the treatment fluid is formulated to have very good leakoff control characteristics, i.e., fluid retention to maintain flowability. The good leak control can be achieved by including a leakoff control system in the treatment fluid of the current application, which may comprise one or more of high viscosity, low viscosity, a fluid loss control agent, selective construction of a multi-modal particle system in a multimodal fluid (MMF) or in a stabilized multimodal fluid (SMMF), or the like, or any combination thereof.

In an embodiment herein, the treatment fluid comprises a packed volume fraction (PVF) greater than a slurry solids volume fraction (SVF), and has a spurt loss value (Vspurt) less than 10 vol % of a fluid phase of the stabilized treatment fluid or less than 50 vol % of an excess fluid phase (Vspurt <0.50*(PVF−SVF), where the "excess fluid phase" is taken as the amount of fluid in excess of the amount present at the condition SVF=PVF, i.e., excess fluid phase=PVF−SVF).

In an embodiment the treatment fluid comprising a Pickering emulsion may also have a very low leakoff rate. For example, the total leakoff coefficient may be about $3\times10^{-4}$ m/min$^{1/2}$ ($10^{-3}$ ft/min$^{1/2}$) or less, or about $3\times10^{-5}$ m/min$^{1/2}$ ($10^{-4}$ ft/min$^{1/2}$) or less. As used herein, Vspurt and the total leak-off coefficient Cw are determined by following the static fluid loss test and procedures set forth in Section 8-8.1, "Fluid loss under static conditions," in *Reservoir Stimulation, 3rd* Edition, Schlumberger, John Wiley & Sons, Ltd., pp. 8-23 to 8-24, 2000, in a filter-press cell using ceramic disks (FANN filter disks, part number 210538) saturated with 2% KC solution and covered with filter paper and test conditions of ambient temperature (25° C.), a differential pressure of 3.45 MPa (500 psi), 100 ml sample loading, and a loss collection period of 60 minutes, or an equivalent testing procedure. In an embodiment of the current application, the treatment fluid has a fluid loss value of less than 10 g in 30 min when tested on a core sample with 1000 mD porosity. In an embodiment of the current application, the treatment fluid has a fluid loss value of less than 8 g in 30 min when tested on a core sample with 1000 mD porosity. In an embodiment of the current application, the treatment fluid has a fluid loss value of less than 6 g in 30 min when tested on a core sample with 1000 mD porosity. In an embodiment of the current application, the treatment fluid has a fluid loss value of less than 2 g in 30 min when tested on a core sample with 1000 mD porosity.

The unique low to no fluid loss property allows the treatment fluid to be pumped at a low rate or pumping stopped (static) with a low risk of screen out. In an embodiment, the low fluid loss characteristic may be obtained by including a leak-off control agent comprising the colloidal particles, and/or one or more additional fluid loss control agents, also referred to in the art as leakoff control agents.

As representative leakoff control agents, which may be used alone or in a multimodal fluid, there may be mentioned latex dispersions, water soluble polymers, submicron particulates, particulates with an aspect ratio higher than 1, or higher than 6, combinations thereof and the like, such as, for example, crosslinked polyvinyl alcohol microgel. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm to 1 micron, such as γ-alumina, colloidal silica, $CaCO_3$, $SiO_2$, bentonite etc.; particulates with different shapes such as glass fibers, flakes, films; and any combination thereof or the like. Fluid loss agents can if desired also include or be used in combination with acrylamido-methyl-propane sulfonate polymer (AMPS). In an embodiment, the leak-off control agent comprises a reactive solid, e.g., a hydrolyzable material such as PGA, PLA or the like; or it can include a soluble or solubilizable material such as a wax, an oil-soluble resin, or another material soluble in hydrocarbons, or calcium carbonate or another material soluble at low pH; and so on. In an embodiment, the leak-off control agent comprises a reactive solid selected from ground quartz, oil soluble resin, degradable rock salt, clay, zeolite or the like. In an embodiment, the leak-off control agent comprises one or more of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass, or the like.

The treatment fluid may additionally or alternatively include, without limitation, friction reducers, clay stabilizers, biocides, crosslinkers, breakers, corrosion inhibitors, and/or proppant flowback control additives. The treatment fluid may further include a product formed from degradation, hydrolysis, hydration, chemical reaction, or other process that occur during preparation or operation.

In an embodiment herein, the treatment fluid may be prepared by combining the proppant if present, and other particles including the Pickering emulsion particles, the carrier liquid and any additives to form a proppant-containing treatment fluid; and stabilizing the proppant-containing treatment fluid. The combination and stabilization may occur in any order or concurrently in single or multiple stages in a batch, semi-batch or continuous operation. For example, in an embodiment, the base fluid may be prepared from a fluid comprising the Pickering emulsion, the carrier liquid and other additives, and then the base fluid combined with the proppant.

The treatment fluid may be prepared on location, e.g., at the wellsite when and as needed using conventional treatment fluid blending equipment.

Figure 3:
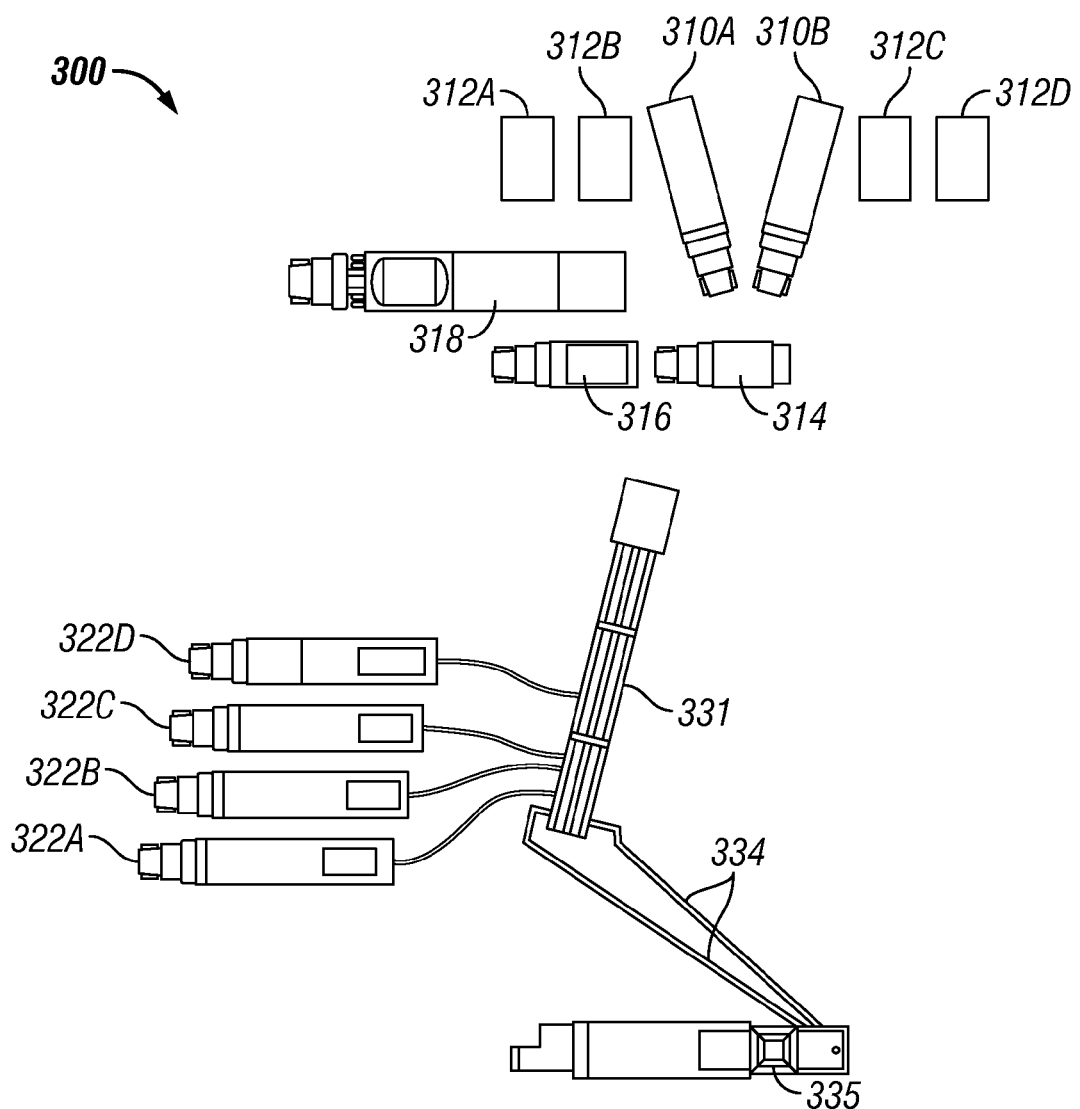
FIG. 3 shows a schematic representation of the wellsite equipment configuration with onsite mixing of a treatment fluid according to some embodiments of the current application.

FIG. 3 shows a wellsite equipment configuration 300 for a fracture treatment job according to some embodiments using the principles disclosed herein, for a land-based fracturing operation. The proppant is contained in sand trailers 310A, 310B. Water tanks 312A, 312B, 312C, 312D are arranged along one side of the operation site. Hopper 314 receives sand from the sand trailers 310A, 310B and distributes it into the mixer truck 316. Blender 318 is provided to blend the carrier medium (such as brine, viscosified fluids, etc.) with the proppant, i.e., "on the fly," and then the slurry is discharged to manifold 331. The final mixed and blended slurry, also called frac fluid, is then transferred to the pump trucks 322A, 322B, 322C, 322D, and routed at treatment pressure through treating line 334 to rig 335, and then pumped downhole. This configuration eliminates the additional mixer truck(s), pump trucks, blender(s), manifold(s) and line(s) normally required for slickwater fracturing operations, and the overall footprint is considerably reduced.

In an embodiment herein, for example in gravel packing, fracturing and frac-and-pack operations, the treatment fluid comprises a Pickering emulsion and a proppant and a fluid phase at a volumetric ratio of the fluid phase (Vfluid) to the proppant (Vprop) equal to or less than 3. In an embodiment, Vfluid/Vprop is equal to or less than 2.5. In an embodiment, Vfluid/Vprop is equal to or less than 2. In an embodiment, Vfluid/Vprop is equal to or less than 1.5. In an embodiment, Vfluid/Vprop is equal to or less than 1.25. In an embodiment, Vfluid/Vprop is equal to or less than 1. In an embodiment, Vfluid/Vprop is equal to or less than 0.75. In an embodiment, Vfluid/Vprop is equal to or less than 0.7. In an embodiment, Vfluid/Vprop is equal to or less than 0.6. In an embodiment, Vfluid/Vprop is equal to or less than 0.5. In an embodiment, Vfluid/Vprop is equal to or less than 0.4. In an embodiment, Vfluid/Vprop is equal to or less than 0.35. In an embodiment, Vfluid/Vprop is equal to or less than 0.3. In an embodiment, Vfluid/Vprop is equal to or less than 0.25. In an embodiment, Vfluid/Vprop is equal to or less than 0.2. In an embodiment, Vfluid/Vprop is equal to or less than 0.1. In an embodiment, Vfluid/Vprop may be sufficiently high such that the treatment fluid is flowable. In an embodiment, the ratio $V_{fluid}/V_{prop}$ is equal to or greater than 0.05, equal to or greater than 0.1, equal to or greater than 0.15, equal to or greater than 0.2, equal to or greater than 0.25, equal to or greater than 0.3, equal to or greater than 0.35, equal to or greater than 0.4, equal to or greater than 0.5, or equal to or greater than 0.6, or within a range from any lower limit to any higher upper limit mentioned above.

Nota bene, the treatment fluid may optionally comprise subproppant particles, which may include the Pickering emulsion, in the whole fluid which are not reflected in the Vfluid/Vprop ratio, which is merely a ratio of the liquid phase (sans solids) volume to the proppant volume. This ratio is useful, in the context of the treatment fluid where the liquid phase is aqueous, as the ratio of water to proppant, i.e., Vwater/Vprop. In contrast, the "ppa" designation refers to pounds proppant added per gallon of base fluid (liquid plus subproppant particles), which can be converted to an equivalent volume of proppant added per volume of base fluid if the specific gravity of the proppant is known, e.g., 2.65 in the case of quartz sand an embodiment, in which case 1 ppa=0.12 kg/L=45 mL/L; whereas "ppg" (pounds of proppant per gallon of treatment fluid) and "ppt" (pounds of additive per thousand gallons of treatment fluid) are based on the volume of the treatment fluid (liquid plus proppant and subproppant particles), which for quartz sand an embodiment (specific gravity=2.65) also convert to 1 ppg=1000 ppt=0.12 kg/L=45 mL/L. The ppa, ppg and ppt nomenclature and their metric or SI equivalents are useful for considering the weight ratios of proppant or other additive(s) to base fluid (water or other fluid and subproppan) and/or to treatment fluid (water or other fluid plus proppant plus subproppant). The ppt nomenclature is generally used in an embodiment reference to the concentration by weight of low concentration additives other than proppant, e.g., 1 ppt=0.12 g/L.

In an embodiment, the proppant-containing treatment fluid comprises 0.27 L or more of proppant volume per liter of treatment fluid (corresponding to 720 g/L (6 ppg) in an embodiment where the proppant has a specific gravity of 2.65), or 0.36 L or more of proppant volume per liter of treatment fluid (corresponding to 960 g/L (8 ppg) in an embodiment where the proppant has a specific gravity of 2.65), or 0.4 L or more of proppant volume per liter of treatment fluid (corresponding to 1.08 kg/L (9 ppg) in an embodiment where the proppant has a specific gravity of 2.65), or 0.44 L or more of proppant volume per liter of treatment fluid (corresponding to 1.2 kg/L (10 ppg) in an embodiment where the proppant has a specific gravity of 2.65), or 0.53 L or more of proppant volume per liter of treatment fluid (corresponding to 1.44 kg/L (12 ppg) in an embodiment where the proppant has a specific gravity of 2.65), or 0.58 L or more of proppant volume per liter of treatment fluid (corresponding to 1.56 kg/L (13 ppg) in an embodiment where the proppant has a specific gravity of 2.65), or 0.62 L or more of proppant volume per liter of treatment fluid (corresponding to 1.68 kg/L (14 ppg) in an embodiment where the proppant has a specific gravity of 2.65), or 0.67 L or more of proppant volume per liter of treatment fluid (corresponding to 1.8 kg/L (15 ppg) in an embodiment where the proppant has a specific gravity of 2.65), or 0.71 L or more of proppant volume per liter of treatment fluid (corresponding to 1.92 kg/L (16 ppg) in an embodiment where the proppant has a specific gravity of 2.65).

As used herein, in an embodiment, "high proppant loading" means, on a mass basis, more than 1.0 kg proppant added per liter of whole fluid including any sub-proppant particles (8 ppa,), or on a volumetric basis, more than 0.36 L proppant added per liter of whole fluid including any sub-proppant particles, or a combination thereof. In an embodiment, the treatment fluid comprises more than 1.1 kg proppant added per liter of whole fluid including any sub-proppant particles (9 ppa), or more than 1.2 kg proppant added per liter of whole fluid including any sub-proppant particles (10 ppa), or more than 1.44 kg proppant added per liter of whole fluid including any sub-proppant particles (12 ppa), or more than 1.68 kg proppant added per liter of whole fluid including any sub-proppant particles (14 ppa), or more than 1.92 kg proppant added per liter of whole fluid including any sub-proppant particles (16 ppa), or more than 2.4 kg proppant added per liter of fluid including any sub-proppant particles (20 ppa), or more than 2.9 kg proppant added per liter of fluid including any sub-proppant particles (24 ppa). In an embodiment, the treatment fluid comprises more than 0.45 L proppant added per liter of whole fluid including any sub-proppant particles, or more than 0.54 L proppant added per liter of whole fluid including any sub-proppant particles, or more than 0.63 L proppant added per liter of whole fluid including any subproppant particles, or more than 0.72 L proppant added per liter of whole fluid including any sub-proppant particles, or more than 0.9 L proppant added per liter of whole fluid including any sub-proppant particles.

In an embodiment, the water content in the fracture treatment fluid formulation is low, e.g., less than 30% by volume of the treatment fluid, the low water content enables low overall water volume to be used, relative to a slickwater fracture job for example, to place a similar amount of proppant or other solids, with low to essentially zero fluid infiltration into the formation matrix and/or with low to zero flowback after the treatment, and less chance for fluid to enter the aquifers and other intervals. The low flowback leads to less delay in producing the stimulated formation, which can be placed into production with a shortened clean up stage or in some cases immediately without a separate flowback recovery operation.

In an embodiment where the fracturing treatment fluid also has a low viscosity and a relatively high SVF, e.g., 40, 50, 60 or 70% or more, the fluid can in some surprising an embodiment be very flowable (low viscosity) and can be pumped using standard well treatment equipment. With a high volumetric ratio of proppant to water, e.g., greater than about 1.0, these embodiments represent a breakthrough in water efficiency in fracture treatments. An embodiment of a low water content in the treatment fluid certainly results in correspondingly low fluid volumes to infiltrate the formation, and importantly, no or minimal flowback during fracture cleanup and when placed in production. In the solid pack, as well as on formation surfaces and in the formation matrix, water can be retained due to a capillary and/or surface wetting effect. In an embodiment, the solids pack obtained from a treatment fluid with multimodal solids can retain a larger proportion of water than conventional proppant packs, further reducing the amount of water flowback. In an embodiment, the water retention capability of the fracture-formation system can match or exceed the amount of water injected into the formation, and there may thus be no or very little water flowback when the well is placed in production.

In some specific embodiments, the proppant laden treatment fluid comprises an excess of a low viscosity continuous fluid phase, e.g., a liquid phase, and a multimodal particle phase comprising a Pickering emulsion, e.g. solids phase, comprising high proppant loading with one or more proppant modes for fracture conductivity and at least one sub-proppant mode to facilitate proppant injection. As used herein an excess of the continuous fluid phase implies that the fluid volume fraction in a slurry (1-SVF) exceeds the void volume fraction (1-PVF) of the solids in the slurry, i.e., SVF<PVF. Solids in the slurry in an embodiment may comprise both proppant and one or more sub-proppant particle modes. In an embodiment, the continuous fluid phase is a liquid phase.

In an embodiment, the treatment fluid is prepared by combining the proppant and a fluid phase comprising the Pickering emulsion, having a viscosity less than 300 mPa-s (170 s$^{-1}$, 25 C) to form the proppant-containing treatment fluid, and stabilizing the proppant-containing treatment fluid. Stabilizing the treatment fluid is described above. In an embodiment, the proppant-containing treatment fluid is prepared to comprise a viscosity between 0.1 and 300 mPa-s (170 s$^{-1}$, 25 C) and a yield stress between 1 and 20 Pa (2.1-42 lb$_f$/ft$^2$). In an embodiment, the proppant-containing treatment fluid comprises 0.36 L or more of proppant volume per liter of proppant-containing treatment fluid (8 ppa proppant equivalent where the proppant has a specific gravity of 2.6), a viscosity between 0.1 and 300 mPa-s (170 s$^{-1}$, 25 C), a solids phase having a packed volume fraction (PVF) greater than 0.72, a slurry solids volume fraction (SVF) less the PVF and a ratio of SVF/PVF greater than about 1−2.1*(PVF−0.72).

In an embodiment, e.g., for delivery of a fracturing stage, the treatment fluid comprises a volumetric proppant/treatment fluid ratio (including proppant and sub-proppant solids) in a main stage of at least 0.27 L/L (6 ppg at sp.gr. 2.65), or at least 0.36 L/L (8 ppg), or at least 0.44 L/L (10 ppg), or at least 0.53 L/L (12 ppg), or at least 0.58 L/L (13 ppg), or at least 0.62 L/L (14 ppg), or at least 0.67 L/L (15 ppg), or at least 0.71 L/L (16 ppg).

In an embodiment, the hydraulic fracture treatment may comprise an overall volumetric proppant/water ratio of at least 0.13 L/L (3 ppg at sp. gr. 2.65), or at least 0.18 L/L (4 ppg), or at least 0.22 L/L (5 ppg), or at least 0.26 L/L (6 ppg), or at least 0.38 L/L (8 ppg), or at least 0.44 L/L (10 ppg), or at least 0.53 L/L (12 ppg), or at least 0.58 L/L (13 ppg). Note that subproppant particles are not a factor in the determination of the proppant water ratio.

In an embodiment, e.g., a front-end stage treatment fluid, the slurry comprises a stabilized solids mixture comprising a Pickering emulsion and a particulated leakoff control system (which may include the colloidal particles, and may optionally include other solid and/or liquid particles, e.g., submicron particles, colloids, micelles, PLA dispersions, latex systems, and the like) and a solids volume fraction (SVF) of at least 0.4.

In an embodiment, e.g., a pad stage treatment fluid, the slurry comprises viscosifier in an amount to provide a viscosity in the pad stage of greater than 300 mPa-s, determined on a whole fluid basis at 170 s$^{-1}$ and 25° C.

In an embodiment, e.g., a flush stage treatment fluid, the slurry comprises a proppant-free slurry comprising a stabilized solids mixture comprising a Pickering emulsion and a particulated leakoff control system having a solids volume fraction (SVF) of at least 0.4. In an embodiment, the proppant-containing fracturing stage may be used with a flush stage comprising a first substage comprising viscosifier and a second substage comprising slickwater. The viscosifier may be selected from viscoelastic surfactant systems, hydratable gelling agents (optionally including crosslinked gelling agents), and the like. In an embodiment, the flush stage comprises an overflush equal to or less than 3200 L (20 42-gal bbls), equal to or less than 2400 L (15 bbls), or equal to or less than 1900 L (12 bbls).

In an embodiment, the proppant stage comprises a continuous single injection of spacers. In an embodiment the treatment fluid comprises a total proppant volume injected into the wellbore or to be injected into the wellbore of at least 800 liters. In an embodiment, the total proppant volume is at least 1600 liters. In an embodiment, the total proppant volume is at least In an embodiment, the total proppant volume is at least 80,000 liters. In an embodiment, the total proppant volume is at least 800,000 liters. The total proppant volume injected into the wellbore or to be injected into the wellbore is typically not more than 16 million liters.

Sometimes it is desirable to stop pumping a treatment fluid during a hydraulic fracturing operation, such as for example, when an emergency shutdown is required. For example, there may be a complete failure of surface equipment, there may be a near wellbore screenout, or there may be a natural disaster due to weather, fire, earthquake, etc. However, with unstabilized fracturing fluids such as slickwater, the proppant suspension will be inadequate at zero pumping rate, and proppant may screen out in the wellbore and/or fail to get placed in the fracture. With slickwater it is usually impossible to resume the fracturing operation without first cleaning the settled proppant out of the wellbore, often using coiled tubing or a workover rig. There is some inefficiency in fluidizing proppant out of the wellbore with coiled tubing, and a significant amount of a specialized clean out fluid will be used to entrain the proppant and lift it to surface. After the clean out, a decision will need to be made whether to repeat the treatment or just leave that portion of the wellbore sub-optimally treated. In contrast, in an embodiment herein, the treatment fluid is stabilized and the operator can decide to resume and/or complete the fracture operation, or to circulate the treatment fluid (and any proppant) out of the well bore. By stabilizing the treatment fluid to practically eliminate particle settling, the treatment fluid possesses the characteristics of excellent proppant conveyance and transport even when static.

Due to the stability of the treatment fluid in an embodiment herein, the proppant will remain suspended and the fluid will retain its fracturing properties during the time the pumping is interrupted. In an embodiment herein, a method comprises combining at least 0.36, at least 0.4, or at least 0.45 L of proppant per liter of base fluid comprising the Pickering emulsion to form a proppant-containing treatment fluid, stabilizing the proppant-containing treatment fluid, pumping the treatment fluid, e.g., injecting the proppant-containing treatment fluid into a subterranean formation and/or creating a fracture in the subterranean formation with the treatment fluid, stopping pumping of the treatment fluid thereby stranding the treatment fluid in the wellbore, and thereafter resuming pumping of the treatment fluid, e.g., to inject the stranded treatment fluid into the formation and continue the fracture creation, and/or to circulate the stranded treatment fluid out of the wellbore as an intact plug with a managed interface between the stranded treatment fluid and a displacing fluid. Circulating the treatment fluid out of the wellbore can be achieved optionally using coiled tubing or a workover rig, if desired, but in an embodiment the treatment fluid will itself suspend and convey all the proppant out of the wellbore with high efficiency. In an embodiment, the method may include managing the interface between the treatment fluid and any displacing fluid, such as, for example, matching density and viscosity between the treatment and displacing fluids, using a wiper plug or pig, using a gelled pill or fiber pill or the like, to prevent density and viscous instabilities.

In an embodiment, the treatment provides production-related features resulting from a low water content and/or the presence of a Pickering emulsion in the treatment fluid, such as, for example, less infiltration into the formation and/or less water flowback. Formation damage occurs whenever the native reservoir conditions are disturbed. A significant source of formation damage during hydraulic fracturing occurs when the fracturing fluids contact and infiltrate the formation. Measures can be taken to reduce the potential for formation damage, including adding salts to improve the stability of fines and clays in the formation, addition of scale inhibitors to limit the precipitation of mineral scales caused by mixing of incompatible brines, addition of surfactants to minimize capillary blocking of the tight pores and so forth. There are some types of formation damage for which additives are not yet available to solve. For example, some formations will be mechanically weakened upon coming in contact with water, referred to herein as water-sensitive formations. Thus, it is desirable to significantly reduce the amount of water that can infiltrate the formation during a well completion operation.

Very low water slurries and water free slurries according to an embodiment disclosed herein offer a pathway to significantly reduce water infiltration and the collateral formation damage that may occur. Low water treatment fluids minimize water infiltration relative to slick water fracture treatments by two mechanisms. First, the water content in the treatment fluid can be less than about 40% of slickwater per volume of respective treatment fluid, and the treatment fluid can provide in an embodiment more than a 90% reduction in the amount of water used per volume or weight of proppant placed in the formation. Second, the solids pack in the treatment fluid, in an embodiment including subproppant particles comprising a Pickering emulsion, retains more water than conventional proppant packs so that less water is released from the treatment fluid into the formation.

After fracturing, water flowback plagues the prior art fracturing operations. Load water recovery typically characterizes the initial phase of well start up following a completion operation. In the case of horizontal wells with massive hydraulic fractures in unconventional reservoirs, 15 to 30% of the injected hydraulic fracturing fluid is recovered during this start-up phase. At some point, the load water recovery rate becomes very low and the produced gas rate high enough for the well to be directed to a gas pipeline to market. We refer to this period of time during load water recovery as the fracture clean up phase. It is normal for a well to clean up for several days before being connected to a gas sales pipeline. The flowback water must be treated and/or disposed of, and delays pipeline production. A low water content slurry according to an embodiment herein can significantly reduce the volume and/or duration, or even eliminate this fracture clean up phase. Fracturing fluids normally are lost into the formation by various mechanisms including filtration into the matrix, imbibition into the matrix, wetting the freshly exposed new fracture face, loss into natural fractures. A low water content slurry will become dry with only a small loss of its water into the formation by these mechanisms, leaving in an embodiment no or very little free water to be required (or able) to flow back during the fracture clean up stage. The advantages of zero or reduced flowback include reduced operational cost to manage flowback fluid volumes, reduced water treatment cost, reduced time to put well to gas sales, reduction of problematic waste that will develop by injected waters solubilizing metals, naturally occurring radioactive materials, etc.

There have also been concerns expressed by the general public that hydraulic fracturing fluid may find some pathway into a potable aquifer and contaminate it. Although proper well engineering and completion design, and fracture treatment execution will prevent any such contamination from occurring, if it were to happen by an unforeseen accident, a slickwater system will have enough water and mobility in an aquifer to migrate similar to a salt water plume. A low water treatment fluid in an embodiment may have a 90% reduction in available water per mass of proppant such that any contact with an aquifer, should it occur, will have much less impact than slickwater.

Subterranean formations are heterogeneous, with layers of high, medium, and low permeability strata interlaced. A hydraulic fracture that grows to the extent that it encounters a high permeability zone will suddenly experience a high leakoff area that will attract a disproportionately large fraction of the injected fluid significantly changing the geometry of the created hydraulic fracture possibly in an undesirable manner. A hydraulic fracturing fluid that would automatically plug a high leakoff zone is useful in that it would make the fracture execution phase more reliable and probably ensure the fracture geometry more closely resembles the designed geometry (and thus production will be closer to that expected). One feature of an embodiment of a treatment fluid comprising a Pickering emulsion is that it will dehydrate and become an immobile mass (plug) upon losing more than 25% of the water it is formulated with. As a treatment fluid in an embodiment only contains up to 50% water by volume, then it will only require a loss of a total of 12.5% of the treatment fluid volume in the high fluid loss affected area to become an immobile plug and prevent subsequent fluid loss from that area; or in an embodiment only contains up to 40% water by volume, requiring a loss of a total of 10% of the treatment fluid volume to become immobile. A slick water system would need to lose around 90% or 95% of its total volume to dehydrate the proppant into an immobile mass.

Sometimes, during a hydraulic fracture treatment, the surface treating pressure will approach the maximum pressure limit for safe operation. The maximum pressure limit may be due to the safe pressure limitation of the wellhead, the surface treating lines, the casing, or some combination of these items. One common response to reaching an upper pressure limit is to reduce the pumping rate. However, with ordinary fracturing fluids, the proppant suspension will be inadequate at low pumping rates, and proppant may fail to get placed in the fracture. The stabilized fluids in an embodiment of this disclosure, which can be highly stabilized and practically eliminate particle settling, possess the characteristic of excellent proppant conveyance and transport even when static. Thus, some risk of treatment failure is mitigated since a fracture treatment can be pumped to completion in an embodiment herein, even at very low pump rates should injection rate reduction be necessary to stay below the maximum safe operating pressure during a fracture treatment with the stabilized treatment fluid.

In an embodiment, the injection of the treatment fluid of the current application can be stopped all together (i.e. at an injection rate of 0 bbl/min). Due to the excellent stability of the treatment fluid, very little or no proppant settling occurs during the period of 0 bbl/min injection. Well intervention, treatment monitoring, equipment adjustment, etc. can be carried out by the operator during this period of time. The pumping can be resumed thereafter. Accordingly, in an embodiment of the current application, there is provided a method comprising injecting a proppant laden treatment fluid into a subterranean formation penetrated by a wellbore, initiating or propagating a fracture in the subterranean formation with the treatment fluid, stopping injecting the treatment fluid for a period of time, restarting injecting the treatment fluid to continue the initiating or propagating of the fracture in the subterranean formation.

In an embodiment, the treatment and system may achieve the ability to fracture using a carbon dioxide proppant stage treatment fluid. Carbon dioxide is normally too light and too thin (low viscosity) to carry proppant in a slurry useful in fracturing operations. However, in a treatment fluid comprising a Pickering emulsion, carbon dioxide may be useful in the liquid phase, especially where the proppant stage treatment fluid also comprises a particulated fluid loss control agent. In an embodiment, the liquid phase comprises at least 10 wt % carbon dioxide, at least 50 wt % carbon dioxide, at least 60 wt % carbon dioxide, at least 70 wt % carbon dioxide, at least 80 wt % carbon dioxide, at least 90 wt % carbon dioxide, or at least 95 wt % carbon dioxide. The carbon dioxide-containing liquid phase may alternatively or additionally be present in any pre-pad stage, pad stage, front-end stage, flush stage, post-flush stage, or any combination thereof.

Various jetting and jet cutting operations in an embodiment are significantly improved by the non-settling and solids carrying abilities of the treatment fluid. Jet perforating and jet slotting are an embodiment for the treatment fluid, wherein the proppant is replaced with an abrasive or erosive particle. Multi-zone fracturing systems using a locating sleeve/polished bore and jet cut opening are an embodiment.

Drilling cuttings transport and cuttings stability during tripping are also improved in an embodiment. The treatment fluid can act to either fracture the formation or bridge off cracks, depending on the exact mixture used. The treatment fluid can provide an extreme ability to limit fluid losses to the formation, a very significant advantage. Minimizing the amount of liquid will make oil based muds much more economically attractive.

The modification of producing formations using explosives and/or propellant devices in an embodiment is improved by the ability of the treatment fluid to move after standing stationary and also by its density and stability.

Zonal isolations operations in an embodiment are improved by specific treatment fluid formulations comprising a Pickering emulsion, optimized for leakoff control and/or bridging abilities. Relatively small quantities of the treatment fluid radically improve the sealing ability of mechanical and inflatable packers by filling and bridging off gaps. Permanent isolation of zones is achieved in an embodiment by bullheading low permeability versions of the treatment fluid into water producing formations or other formations desired to be isolated. Isolation in an embodiment is improved by using a setting formulation of the treatment fluid, but non-setting formulations can provide very effective permanent isolation. Temporary isolation may be delivered in an embodiment by using degradable materials to convert a non-permeable pack into a permeable pack after a period of time.

The pressure containing ability and ease of placement/removal of sand plugs in an embodiment are significantly improved using appropriate treatment fluid formulations comprising a Pickering emulsion selected for high bridging capacity. Such formulations will allow much larger gaps between the sand packer tool and the well bore for the same pressure capability. Another major advantage is the reversibility of dehydration in an embodiment; a solid sand pack may be readily re-fluidized and circulated out, unlike conventional sand plugs.

In an embodiment, plug and abandon work may be improved using CRETE cementing formulations in the treatment fluid comprising a Pickering emulsion, and also by placing bridging/leakoff controlling treatment fluid formulations below and/or above cement plugs to provide a seal repairing material. The ability of the treatment fluid to re-fluidize after long periods of immobilization facilitates this embodiment. CRETE cementing formulations are disclosed in U.S. Pat. No. 6,626,991, GB 2,277,927, U.S. Pat. No. 6,874,578, WO 2009/046980, Schlumberger CemCRETE Brochure (2003), and Schlumberger Cementing Services and Products—Materials, pp. 39-76 (2012), available at http://www.slb.com/~/media/Files/cementing/catalogs/05_cementing_materials.pdf which are hereby incorporated herein by reference, and are commercially available from Schlumberger.

This treatment fluid, in an embodiment finds application in pipeline cleaning to remove methane hydrates due to its carrying capacity and its ability to resume motion.

Accordingly, the present disclosure provides the following embodiments:

1. A treatment fluid, comprising:
   a plurality of particles comprising an Apollonianistic particle size distribution comprising particles of a Pickering emulsion, comprising particles of a first liquid phase dispersed in a continuous second liquid phase, and a plurality of colloidal particles, at least a portion of the colloidal particles adsorbed to a liquid-liquid interface between the first liquid phase and the second liquid phase.
2. The treatment fluid of embodiment 1, wherein at least a portion of the plurality of colloidal particles is freely dispersed in the second liquid phase, and wherein the freely dispersed colloidal particles comprise at least one particle size distribution mode of the Apollonianistic particle size distribution.
3. The treatment fluid of embodiment 1 or 2, wherein the colloidal particles have a particle size distribution mode from 0.005 to 100 microns.
4. The treatment fluid of any one of embodiments 1 to 3, wherein the colloidal particles comprise an aspect ratio from 1.1 to about 1000.
5. The treatment fluid of any one of embodiments 1 to 4, wherein the colloidal particles comprise a contact angle of about 60° to about 120°, when determined at a boundary of the colloidal particle/first liquid phase/second liquid phase interface.
6. The treatment fluid of any one of embodiments 1 to 5, wherein the colloidal particles have an average length from about 0.001 microns to about 100 microns.
7. The treatment fluid of any one of embodiments 1 to 6, wherein the colloidal particles comprise fibers having an aspect ratio from about 10 to about 1000.
8. The treatment fluid of any one of embodiments 1 to 7, wherein the colloidal particles have been surface modified to comprise a contact angle of about 20° to about 150°, or about 60° to about 120°, when determined at a boundary of the colloidal particle/first liquid phase/second liquid phase interface.
9. The treatment fluid of any one of embodiments 1 to 8, further comprising at least one Ostwald ripening inhibitor which is soluble or miscible in the first phase or which itself serves as the first phase.
10. The treatment fluid of any one of embodiments 1 to 9, further comprising from about 1 to 20 parts per 100 parts by weight of one or more of a dispersant, a surfactant, a viscosifier, or a defoamer.
11. The treatment fluid of any one of embodiments 1 to 10, wherein the colloidal particles are hydrolyzable.
12. A treatment fluid, comprising:
a Pickering emulsion comprising particles of a first liquid phase dispersed in a continuous second liquid phase, and a plurality of hydrolyzable colloidal particles, at least a portion of which are adsorbed to a liquid-liquid interface between the first liquid phase and the second liquid phase.
13. The treatment fluid of embodiment 12, wherein the hydrolyzable colloidal particles comprise wax, $C_1$-$C_{20}$ aliphatic polyester, polylactic acid, polyglycolic acid, polycaprolactone, polyhydroxybutyrate, polyhydroxybutyrate-valerate copolymer, $C_1$-$C_{20}$ aliphatic polycarbonate, polyphosphazene, polysaccharide, dextran, cellulose, chitin, chitosan, protein, polyamino acid, polyethylene oxide, microcrystalline cellulose, natural plant fibers, silk, stearic acid, polyvinyl pyrrolidone, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, iron oxides, copper oxides, aluminum oxide, precipitated silica, fumed silica, or a combination thereof.
14. The treatment fluid of embodiment 12 or 13, wherein the hydrolyzable colloidal particles comprise fibers having an aspect ratio from about 10 to about 1000.
15. A method, comprising:
dispersing a first liquid phase in a second liquid phase in the presence of a plurality of colloidal particles under conditions sufficient to produce a Pickering emulsion comprising a plurality of emulsion particles comprising the first liquid phase dispersed in the continuous second liquid phase, and comprising at least a portion of the plurality of colloidal particles adsorbed to a liquid-liquid interface between the first liquid phase and the second liquid phase;
mixing the emulsion in a carrier fluid to produce a treatment fluid comprising a plurality of particles having an Apollonianistic particle size distribution; and circulating the treatment fluid into a wellbore.
16. The method of embodiment 15, further comprising forming a pack of the solids in the wellbore, wherein the pack comprises at least one particle size distribution mode comprising the emulsion particles.
17. The method of embodiment 15 or 16, wherein at least a portion of the plurality of colloidal particles is freely dispersed in the treatment fluid, and wherein the pack comprises at least one particle size distribution mode comprising the freely dispersed colloidal particles.
18. The method of any one of embodiments 15 to 17, further comprising removing at least a portion of the emulsion particles from the pack to form a permeable proppant pack.
19. The method of embodiment 18, further comprising producing or injecting a fluid through the permeable proppant pack.
20. The method of embodiment 19, wherein the permeable proppant pack is disposed in a fracture.
21. A method comprising:
dispersing a first liquid phase in a second liquid phase in the presence of a plurality of hydrolyzable colloidal particles under conditions sufficient to produce a Pickering emulsion comprising a plurality of emulsion particles comprising the first liquid phase dispersed in the continuous second liquid phase, and comprising at least a portion of the plurality of hydrolyzable colloidal particles adsorbed to a liquid-liquid interface between the first liquid phase and the second liquid phase;
mixing the emulsion in a carrier fluid to produce a treatment fluid; and
circulating the treatment fluid into a wellbore.
22. The method of embodiment 21, wherein the hydrolyzable colloidal particles comprise wax, $C_1$-$C_{20}$ aliphatic polyester, polylactic acid, polyglycolic acid, polycaprolactone, polyhydroxybutyrate, polyhydroxybutyrate-valerate copolymer, $C_1$-$C_{20}$ aliphatic polycarbonate, polyphosphazene, polysaccharide, dextran, cellulose, chitin, chitosan, protein, polyamino acid, polyethylene oxide, microcrystalline cellulose, natural plant fibers, silk, stearic acid, polyvinyl pyrrolidone, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, iron oxides, copper oxides, aluminum oxide, precipitated silica, fumed silica, or a combination thereof.
23. The method of embodiment 21 or 22, wherein the hydrolyzable colloidal particles comprise fibers having an aspect ratio from about 10 to about 1000.
24. A treatment fluid produced according to any one of embodiments 15 to 17, or 21 to 23.
25. A treatment fluid according to any one of embodiments 1 to 14, comprising less than about 0.1 wt % of a surfactant.

26. A treatment fluid according to any one of embodiments 1 to 14, comprising at least one of the following stability indicia:
(1) an SVF of at least 0.4 up to SVF=PVF;
(2) a low-shear viscosity of at least 1 Pa-s ($5.11\ s^{-1}$, 25° C.);
(3) a yield stress (as determined herein) of at least 1 Pa;
(4) an apparent viscosity of at least 50 mPa-s ($170\ s^{-1}$, 25° C.);
(5) a multimodal solids phase;
(6) a solids phase having a PVF greater than 0.7;
(7) a viscosifier selected from viscoelastic surfactants, in an amount ranging from 0.01 up to 7.2 g/L (60 ppt), and hydratable gelling agents in an amount ranging from 0.01 up to 4.8 g/L (40 ppt) based on the volume of fluid phase;
(8) hydrolyzable colloidal particles;
(9) a particle-fluid density delta less than 1.6 g/mL, (e.g., particles having a specific gravity less than 2.65 g/mL, carrier fluid having a density greater than 1.05 g/mL or a combination thereof);
(10) particles having an aspect ratio of at least 6;
(11) ciliated or coated proppant; and
(12) combinations thereof.

While the disclosure has provided specific and detailed descriptions to various embodiments, the same is to be considered as illustrative and not restrictive in character. Those skilled in the art will appreciate that many modifications are possible in the example an embodiment without materially departing from the disclosure. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. In the claims, means-plus-function clauses are intended to cover the structures described herein as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

We claim:

1. A treatment fluid, comprising:
a plurality of particles comprising an Apollonianistic particle size distribution comprising particles of a Pickering emulsion comprising a first liquid phase dispersed in a continuous second liquid phase and a plurality of colloidal particles adsorbed to a liquid-liquid interface between the first liquid phase and the second liquid phase.

2. The treatment fluid of claim 1, wherein the particles of the Pickering emulsion comprise a particle size distribution mode from 1 to 100 microns.

3. The treatment fluid of claim 1, further comprising a portion of the plurality of colloidal particles freely dispersed in the second liquid phase, wherein the freely dispersed colloidal particles comprise at least one particle size distribution mode of the Apollonianistic particle size distribution.

4. The treatment fluid of claim 1, wherein the colloidal particles have a particle size distribution mode from 0.005 to 10 microns.

5. The treatment fluid of claim 1, wherein the colloidal particles comprise an aspect ratio from 1.1 to about 1000.

6. The treatment fluid of claim 1, wherein the colloidal particles comprise a contact angle of about 20° to about 150°, when determined at a boundary of the colloidal particle/first liquid phase/second liquid phase interface.

7. The treatment fluid of claim 1, wherein the colloidal particles comprise a contact angle of about 60° to about 120°, when determined at a boundary of the colloidal particle/first liquid phase/second liquid phase interface.

8. The treatment fluid of claim 1, wherein the colloidal particles comprise fibers having an aspect ratio from about 10 to about 1000.

9. The treatment fluid of claim 1, wherein the colloidal particles have been surface modified to comprise a contact angle of about 60° to about 120°, when determined at a boundary of the colloidal particle/first liquid phase/second liquid phase interface.

10. The treatment fluid of claim 1, further comprising at least one Ostwald ripening inhibitor which is soluble or miscible in the first liquid phase or which itself serves as the first liquid phase.

11. The treatment fluid of claim 1, further comprising from about 1 to 20 parts per 100 parts by weight of one or more of a dispersant, a surfactant, a viscosifier, or a defoamer.

12. The treatment fluid of claim 1, wherein the Pickering emulsion particles comprise hydrolysable colloidal particles.

13. The treatment fluid of claim 1, wherein the hydrolyzable colloidal particles comprise wax, $C_1$-$C_{20}$ aliphatic polyester, polylactic acid, polyglycolic acid, polycaprolactone, polyhydroxybutyrate, polyhydroxybutyrate-valerate copolymer, $C_1$-$C_{20}$ aliphatic polycarbonate, polyphosphazene, polysaccharide, dextran, cellulose, chitin, chitosan, protein, polyamino acid, polyethylene oxide, microcrystalline cellulose, natural plant fibers, silk, stearic acid, polyvinyl pyrrolidone, calcium carbonate, calcium sulfate, zinc oxide, titanium dioxide, magnesium oxide, magnesium sulfate, magnesium hydroxide, magnesium borate, aluminum borate, potassium titanate, barium titanate, hydroxyapatite, attapulgite, iron oxides, copper oxides, aluminum oxide, precipitated silica, fumed silica, or a combination thereof.

14. The treatment fluid of claim 1, comprising less than about 0.1 wt % of a surfactant.

* * * * *